United States Patent
Thompson

(10) Patent No.: US 11,022,204 B2
(45) Date of Patent: Jun. 1, 2021

(54) MULTIPLE GEAR RANGE TRANSMISSION

(71) Applicant: QINETIQ LIMITED, Hampshire (GB)

(72) Inventor: Robert William Thompson, Camberley (GB)

(73) Assignee: QINETIQ LIMITED, Hampshire (GB)

( * ) Notice: Subject to any disclaimer, the term of this patent is extended or adjusted under 35 U.S.C. 154(b) by 280 days.

(21) Appl. No.: 16/088,047

(22) PCT Filed: Mar. 23, 2017

(86) PCT No.: PCT/EP2017/057000
§ 371 (c)(1),
(2) Date: Sep. 24, 2018

(87) PCT Pub. No.: WO2017/162826
PCT Pub. Date: Sep. 28, 2017

(65) Prior Publication Data
US 2020/0300345 A1     Sep. 24, 2020

(30) Foreign Application Priority Data

Mar. 24, 2016 (GB) ...................................... 1605063
Jun. 20, 2016 (GB) ...................................... 1610691

(51) Int. Cl.
*F16H 3/091* (2006.01)
*F16H 37/04* (2006.01)

(52) U.S. Cl.
CPC ........... *F16H 37/046* (2013.01); *F16H 3/091* (2013.01); *F16H 2200/0065* (2013.01)

(58) Field of Classification Search
CPC . F16H 37/046; F16H 3/091; F16H 2200/0065
See application file for complete search history.

(56) References Cited

U.S. PATENT DOCUMENTS

| 2,042,235 A | 5/1936 | Misiak |
| 4,464,945 A | 8/1984 | Ertl |

(Continued)

FOREIGN PATENT DOCUMENTS

| DE | 2110434 A1 | 9/1971 |
| DE | 3708100 A1 | 9/1988 |

(Continued)

OTHER PUBLICATIONS

International Search Report and Written Opinion from PCT Patent App. No. PCT/EP2017/057000 (dated Jun. 7, 2017).

(Continued)

*Primary Examiner* — Justin Holmes
(74) *Attorney, Agent, or Firm* — Kenealy Vaidya LLP

(57) ABSTRACT

Some embodiments are directed to a transmission including a plurality of shafts, each carrying a plurality of drive members, the drive members on each shaft arranged to operatively cooperate with those carried by at least one other shaft for transferring load between a torque input and a torque output of the transmission in use, the transmission being configured such that respective resultant gear ratios between the torque input and the torque output can be selected in use from each of a plurality of groups thereof by changing a load path between the torque input and the torque output, wherein each group of selectable resultant gear ratios has a load path feature for transferring load between a pair of the shafts which is common to the selectable resultant gear ratios within that group.

24 Claims, 17 Drawing Sheets

(56) References Cited

U.S. PATENT DOCUMENTS

| | | | | |
|---|---|---|---|---|
| 4,627,301 A | * | 12/1986 | Bainbridge | ............ F16H 3/006 |
| | | | | 74/333 |
| 5,718,148 A | | 2/1998 | Bender | |
| 7,770,480 B2 | * | 8/2010 | Martin | ................... F16H 63/30 |
| | | | | 74/333 |
| 2003/0213318 A1 | | 11/2003 | Matsumoto et al. | |

FOREIGN PATENT DOCUMENTS

| | | |
|---|---|---|
| DE | 4444120 C1 | 5/1996 |
| DE | 19924501 A1 | 12/2000 |
| EP | 0034814 A1 | 9/1981 |
| GB | 1324765 A | 7/1973 |
| GB | 2464571 A | 4/2010 |
| GB | 2476956 A | 7/2011 |
| GB | 2506199 A | 3/2014 |
| JP | H01224545 A | 9/1989 |
| JP | H0544796 A | 2/1993 |
| JP | H10502159 A | 2/1998 |
| JP | 2008531948 A | 8/2008 |
| JP | 2011237003 A | 11/2011 |
| JP | 2012172793 A | 9/2012 |
| JP | 2015532968 A | 11/2015 |
| WO | 2006095140 A1 | 9/2006 |
| WO | WO2014/049317 A1 | 4/2014 |

OTHER PUBLICATIONS

Search Report for British Patent App. No. GB1610691.6 (dated Dec. 21, 2016).

* cited by examiner

MULTIPLE GEAR RANGE TRANSMISSION

CROSS REFERENCE TO RELATED APPLICATION(S)

This application is a national phase filing under 35 C.F.R. § 371 of and claims priority to PCT Patent Application No. PCT/EP2017/057000, filed on Mar. 23, 2017, which claims the priority benefit under 35 U.S.C. § 119 of British Patent Application No. 1610691.6, filed on Jun. 20, 2016, and British Patent Application No. 1605063.5, filed on Mar. 24, 2016, the contents of each of which are hereby incorporated in their entireties by reference.

BACKGROUND

Some embodiments relate to a transmission, and in particular, though not exclusively, to a vehicle transmission for implementing gear shifts.

WO2014/0493171A1 describes a gearbox known as the Q-Shift gearbox, which is illustrated in FIG. 1 herein. The gearbox shown has four selectable gear ratios and is suitable for use in car. Larger vehicles having a low power to weight ratio (e.g. trucks and lorries) typically require more selectable gear ratios than this. For a Q-Shift gearbox to have more selectable gear ratios, more gears are required to be coupled to the opposing transmission shafts.

SUMMARY

The Q-Shift gearbox becomes longer with increasing numbers of selectable gear ratios, which can be unpractical to implement in some vehicles due to limited space in which to house a transmission. Some embodiments are thus configured to address or resolve this and/or other issues.

Some embodiments provide a multiple gear range transmission including an input shaft, an output shaft and at least one bridging shaft, each carrying a plurality of drive members;
  wherein the bridging shaft is not connected to a torque input or output;
  wherein drive members on the bridging shaft operatively cooperate with those carried on either the input shaft and/or output shaft so as to transfer load between the input shaft and the output shaft via a plurality of selectable load paths corresponding to a plurality of respective resultant gear ratios grouped in at least two gear ranges;
  wherein each shaft has one or more drive members capable of being selectively rotationally fixed to the shaft;
  wherein successive gear ratios up or down a gear range are selectable, using load paths that include different respective drive members from one of either the input or output shafts;
  wherein successive gear ranges are selectable using load paths that include different respective drive members from the other of either the input or output shafts; and,
  wherein a transition from a selected gear at the top or bottom of a selected gear range to the next available gear in the next available gear range involves selection of a new load path including drive members from the input and output shaft that are not involved in the load path for the currently selected gear.

As previously discussed, primary gearboxes that complete gear changes (gear shifts) without interrupting torque transmission or dipping a clutch are known and include, for example, the Q-shift gearbox referenced earlier. For a vehicle (e.g. heavy goods vehicle) requiring a wide gear range with lots of gear ratios, a simple two shaft gear box is impractical; however, the use of an additional range change gear box would involve declutching and interruption of torque transmission, which would lose some of the benefits of the primary gearbox.

In a transmission according to this first aspect, successive gear ratios up or down a gear range are selectable using load paths including different respective drive members from one of either the input or output shafts, which allows a gear change without interruption of torque transmission, as in the case of a Q shift type transmission.

Moreover, a transition from a selected gear at the top or bottom of a selected gear range to the next available gear in the next available gear range involves selection of a new load path including drive members from the input and output shaft that are not involved in the load path for the currently selected gear, which also allows a gear range transition without interruption of torque transmission.

In a possible embodiment, a load path feature characterizing a specific gear range will usually be a specific drive member selected on the output shaft, with drive members on that shaft being arranged in increasing size corresponding to respective higher gear ranges (for higher speeds). In that scenario, a specific drive member is selected on the input shaft in order to change gears within a gear range, with drive members on the input shaft also being arranged in increasing size corresponding to respective higher gears (for higher speeds) within a gear range.

Usually such a transmission includes an input shaft, an output shaft and only one bridging shaft arranged in a triangular arrangement (viewed end-on).

Usually, all the drive members on the input shaft are capable of being selectively rotationally fixed to the shaft. Likewise, usually all the drive members on the output shaft are capable of being selectively rotationally fixed to the shaft.

The present transmission is particularly for use in vehicles where torque needs to be transmitted in two opposed senses, so as to convey both engine acceleration and braking. Thus, all drive members capable of being selectively rotationally fixed to a shaft are preferably or advantageously fixed in a manner allowing torque to be transmitted in two opposed senses (as for any permanently fixed drive members).

Drive members that are capable of being selectively rotationally fixed to a shaft may be so fixed by engaging dog hubs (that rotate with the shaft) on either side of each such drive member, and wherein a forward driving dog hub for one drive member is mechanically coupled to a reverse driving hub for another said drive member (as in the case of the Q shift mechanism) such that those two dog hubs cannot be caused to engage such drive members simultaneously. This avoids lock-up during gear changes within a gear range.

Similarly, for any particular shaft (such as the input shaft and/or the output shaft) that includes a pair of such drive members at its respective ends, a forward driving dog hub for one of those drive members may be mechanically coupled to a reverse driving hub for the other of those drive members (for example by a rigid elongate coupling extending along the shaft) such that those two dog hubs also cannot be caused to engage those drive members simultaneously. This avoids lock-up during a transition between different gear ranges.

The bridging shaft must or should have at least one drive member capable of being selectively rotationally fixed to the shaft, so that it can be coupled or uncoupled from the bridging shaft, which member should usually be at one end of the bridging shaft. Ideally, the other end of the bridging shaft should usually have a similar drive member capable of being selectively rotationally fixed to the shaft. For bridging shafts with more than two drive members, it is possible for intermediate drive members disposed between the end drive members to be permanently fixed to the bridging shaft (e.g. since these need not be involved in gear range changes where disconnection from the bridging shaft is important).

In a possible embodiment, all the drive members of the input shaft and output shaft are selectively rotationally fixed to the shaft and a change in which one of the drive members is rotationally fixed to either the input shaft or the output shaft causes a change in the range of resultant gear ratios that can be selected, while gear ratios in each range are individually selected by changing which drive members are rotationally fixed to the other of the input or output shaft. Usually, a change in which one of the drive members is rotationally fixed to the output shaft causes a change in the range of resultant gear ratios that can be selected, while gear ratios in each range are individually selected by changing which drive members are rotationally fixed to the input shaft.

Respective drive members of the input shaft, output shaft and bridging shaft may merely form a simple spur gear train across those shafts. For example, respective end drive members of the input shaft, output shaft and bridging shaft may lie along a straight line to form a single aligned gear train across the shafts. This is possible for the smallest drive members (lowest gear in a range). For later gears (with larger drive members), the required increase in gear ratio may be achieved using more complex gear trains. For example, respective drive members of the output shaft and bridging shaft may form a compound gear train or planetary gear train across those shafts.

In particular, the bridging shaft may include at least one compound drive member including two differently sized parts that rotate together and that operatively cooperate with drive members on the input shaft and output shaft, respectively, thereby forming a compound gear train across the three shafts. Such compound drive members may be permanently fixed to the bridging shaft (e.g. for middle drive members) or selectively rotationally fixed thereto (e.g. for end compound drive members).

Ideally, the size and configuration of the drive members is selected such that, when progressing from the lowest gear to the highest gear in the transmission, all the steps in gear including transitions between gear ranges, are substantially equal steps. This means that the gears are truly sequential and none of the gears are redundant after a range change, as in the case of some related art range changing gear boxes.

In particular, the ratios of the selectable connections from the bridging shaft to the output shaft should preferably or advantageously be suitable to ensure similar ratio changes from input shaft to output shaft on a range change shift as for non-range change shifts. One of the connections from the bridging shaft to the output shaft may be a gear on the output shaft meshing with a gear on the bridging shaft which also meshes with a gear on the input shaft, but to provide the desired ratios other connections need to be either via an additional gear on the bridging shaft or another gearing connection for example a planetary gear connection.

For the avoidance of doubt, by input and output shafts is meant shafts in operative connection with a torque input and output of the transmission, respectively. The bridging shaft is an intermediate shaft lying between them (e.g. in bearings) that transfers a torque load between them and is not itself connected to a torque input or output. Drive members on each said shaft are arranged to operatively cooperate with those carried by at least one other said shaft for transferring load between a torque input and a torque output of the transmission in use but drive members on the input shaft and output shaft do not directly operatively cooperate with each other.

Preferably or advantageously, the drive members are selectively rotationally fixed to the shaft by the Q shift mechanism referenced below. In that mechanism, each drive member is temporarily fixed to rotate with its shaft by a pair of dog hubs that temporarily simultaneously engage with the opposed side faces of the drive member in respective positive and negative torque connections, so as respectively to convey engine acceleration and braking in the two opposed torque senses. The dog hubs are mounted such that they usually rotate with the shaft (e.g. by spline couplings) but are caused axially to slide to engage/disengage with the drive members by activation of a selection mechanism. Complementary projections on the dog hub faces and drive member side faces may engage to provide the positive and negative torque connections and may be shaped to allow gradual engagement (drawing in) and disengagement upon reversal of the torque connection.

Some other embodiments provide a transmission including a plurality of shafts each carrying a plurality of drive members, the drive members on each said shaft arranged to operatively cooperate with those carried by at least one other said shaft for transferring load between a torque input and a torque output of the transmission in use, the transmission being configured such that respective resultant gear ratios between the torque input and the torque output can be selected in use from each of a plurality of groups thereof by changing a load path between the torque input and the torque output, wherein each said group of selectable resultant gear ratios has a load path feature for transferring load between a pair of the shafts which is common to the selectable resultant gear ratios within that group.

Some other embodiments provide optional features and particulars of such a transmission. However, any feature mentioned above in connection with first aspect may also be incorporated in this second aspect.

According to some other embodiments, there is provided a vehicle.

BRIEF DESCRIPTION OF THE DRAWINGS

Some embodiments will now be described by way of non-limiting example with reference to the accompanying drawings, in which:

FIGS. 17 and 18 are schematic line drawings of a bridging shaft and an output shaft having planetary gear connections there between.

DETAILED DESCRIPTION OF EXEMPLARY EMBODIMENTS

Figure 1:
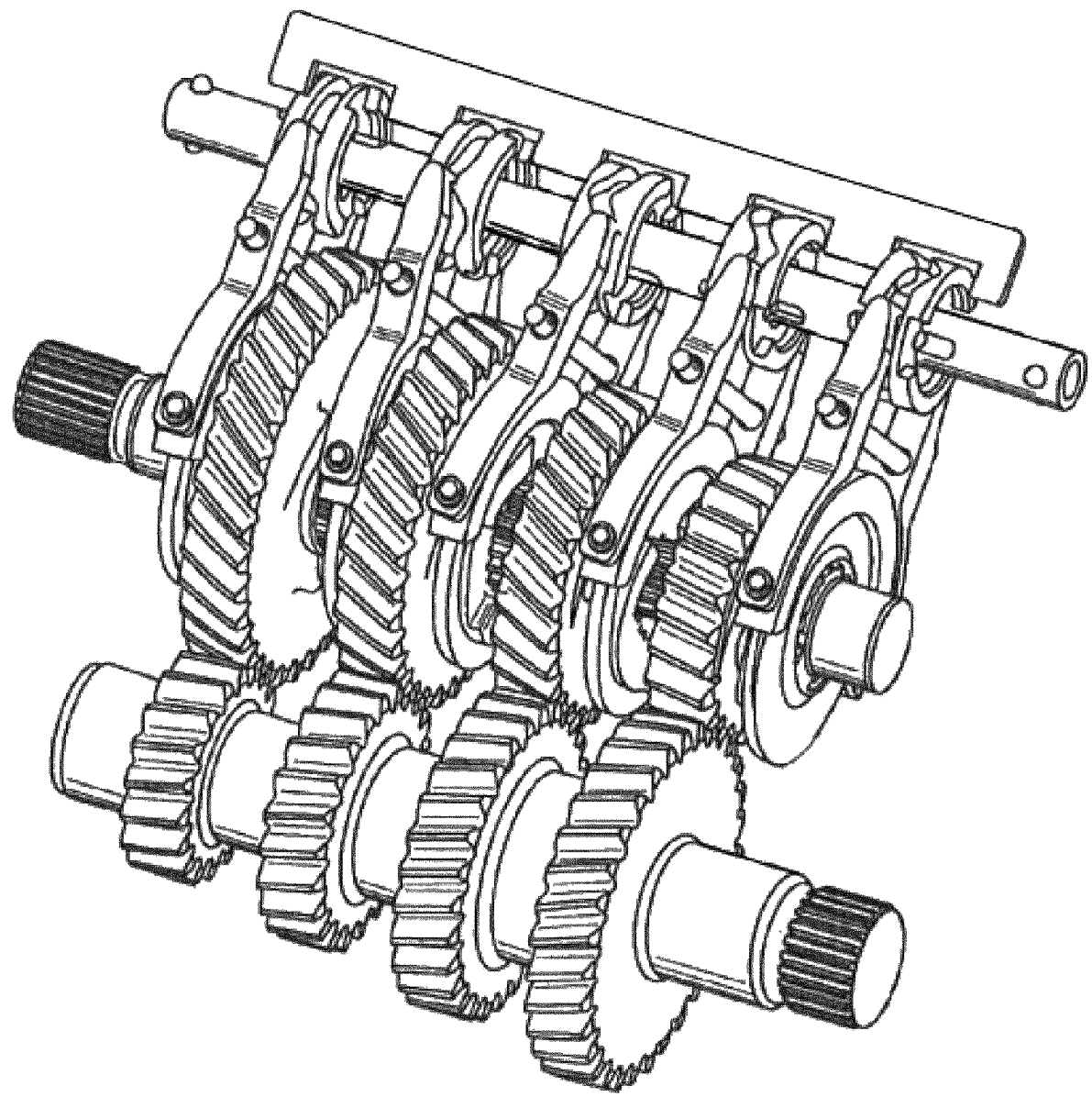
FIG. 1 is a schematic perspective view of a known related art gearbox.
Figure 2A:
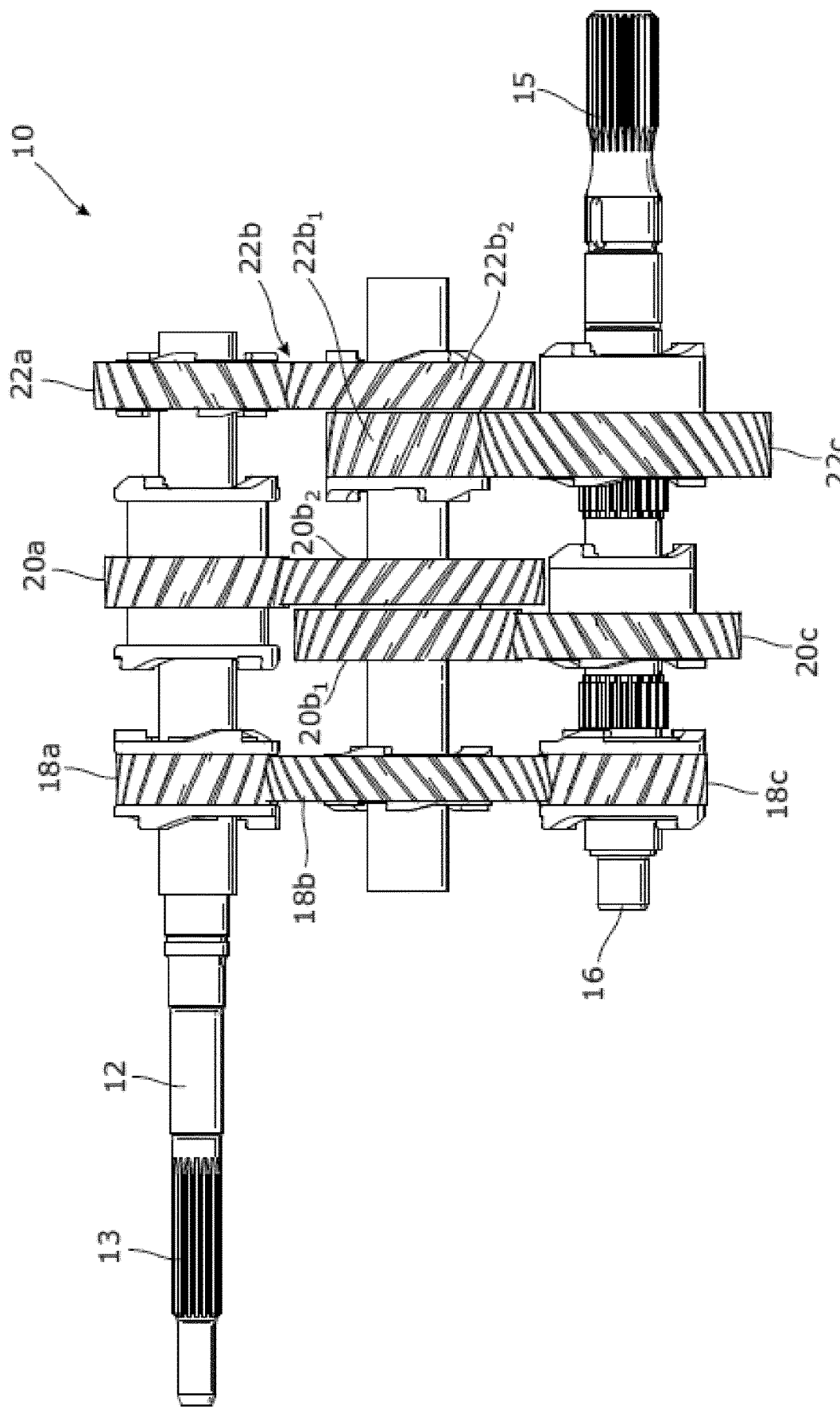
FIGS. 2a and 2b are schematic plan views of a transmission according to an embodiment, respectively showing the dog hubs hidden (for clarity) and present but in a neutral condition.
Figure 2B:
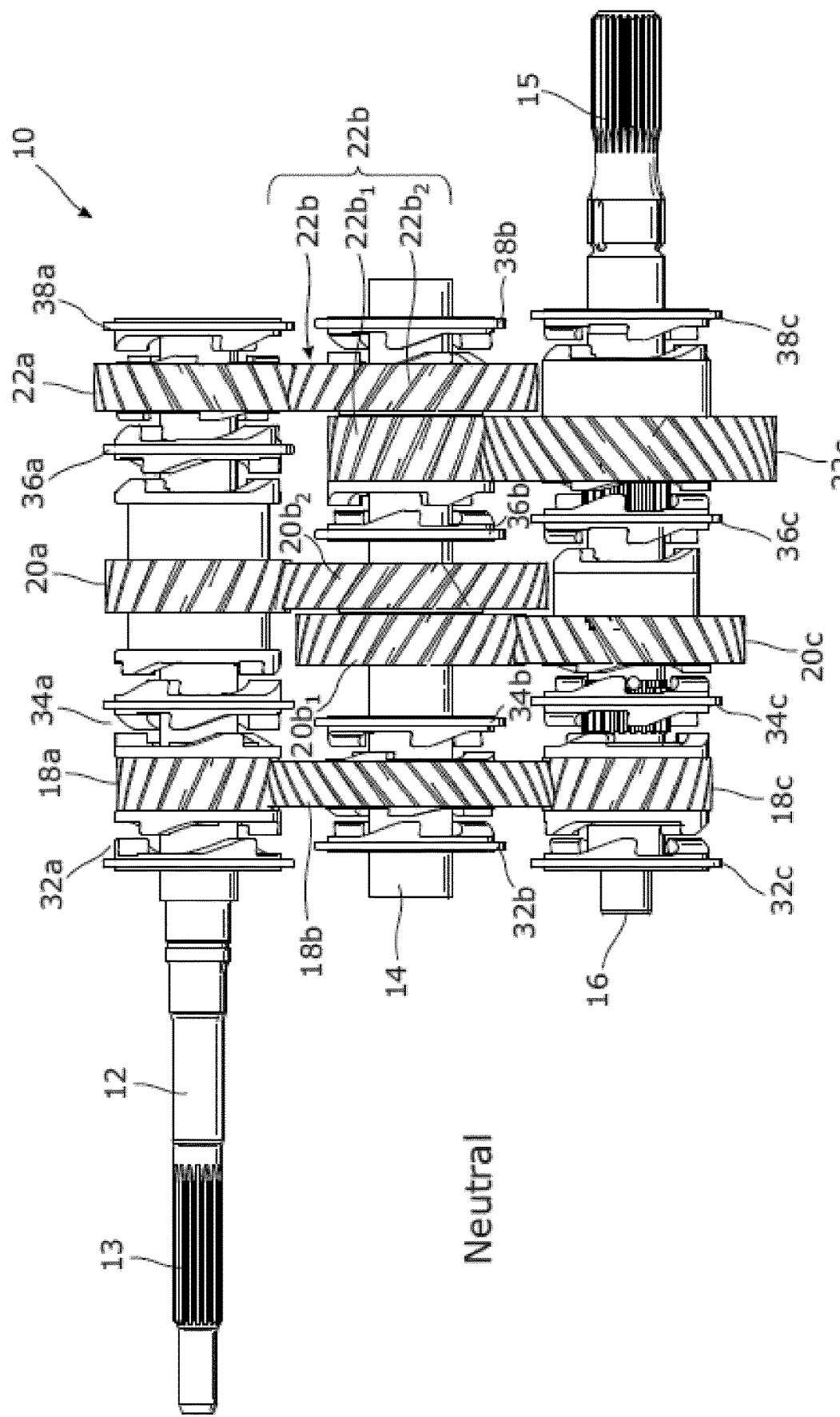

FIGS. 2a and 2b show a vehicle transmission 10 according to an embodiment. For ease of understanding, FIG. 2a shows the transmission with dog hubs removed, whilst FIG. 2b shows the transmission in a neutral condition.

Transmission 10 has an input shaft 12, a bridging shaft 14 and an output shaft 16 arranged parallel to each other. The input shaft 12 carries first to third gears 18a, 20a, 22a with progressively increasing diameters from left to right. The bridging shaft 14 carries primary gear 18b, secondary gear $20b_1$, tertiary gear $20b_2$ and quaternary gear 22b which is a compound gear. The quaternary gear 22b has a first portion $22b_1$ with a smaller diameter than a second portion $22b_2$. The output shaft 16 carries first to third gears 18c, 20c, 22c with progressively increasing diameters from left to right. A resultant gear ratio between torque input and output features 13, 15 of the transmission 10 can be changed by selectively causing different combinations of gears to be rotationally fixed to the respective shafts 12, 14, 16 so as to selectively change a load path between the torque input and output features. Respective gear sizes and tooth numbers are selected such that progressive shifts between separate selectable gear ratio configurations (FIGS. 3 to 11) result in similar step variations in the overall resultant gear ratio between the torque input and output features 13, 15.

In more detail, the primary gear 18b on the bridging shaft 14 meshes with the first gear 18a on the input shaft, and also the first gear 18c on the output shaft 16. The secondary gear $20b_1$ on the bridging shaft 14 meshes with the second gear 20c on the output shaft 16. The tertiary gear $20b_2$ on the bridging shaft 14 meshes with the second gear 20a on the input shaft 12. The first (reduced diameter) portion $22b_1$ of the quaternary gear 22b on the bridging shaft 14 meshes with the third gear 22c on the output shaft 16, whereas the second (larger diameter) portion $22b_2$ of the quaternary gear 22b meshes with the third gear 22a on the input shaft 12.

All of the aforementioned gears except both the secondary gear $20b_1$ and the tertiary gear $20b_2$ on the bridging shaft 14 are mounted on their respective shafts by a bearing. Such a bearing could include a combination of plain thrust washers and a needle roller bearing, thus causing the gears to be axially and radially located on their respective shafts but free to rotate relative thereto. The secondary $20b_1$ and the tertiary gear $20b_2$ on the bridging shaft 14 are permanently rotationally fixed thereto e.g., by welding.

No load path exists between the torque input and output features 13, 15 in FIG. 2b because in this configuration the transmission 10 is in a neutral condition. In this condition the gears selectively rotationally fixed to respective shafts include the third gear 22a on the input shaft 12 and the first gear 18c on the output shaft 16. When torque is applied to the torque input feature 13 (e.g. from an engine or motor upstream from the transmission 10 in a vehicle powertrain) the input shaft 12 and thus the third gear 22a are drivingly rotated. Torque is transferred directly through the quaternary gear 18b on the bridging shaft 14, which is free to rotate relative thereto, to the third gear 22c on the output shaft 16. However, the third gear 22c is not rotationally fixed relative to the output shaft 22c and so does not transfer torque to the output shaft 16 upon being drivingly rotated. Similarly, when torque is applied to the torque output feature 13 (which could occur in a negative torque condition e.g. if a driver lifts their foot off the vehicle throttle) the output shaft 16 and thus the first gear 18c are drivingly rotated. Torque is transferred directly through the primary gear 18b on the bridging shaft 14, which is free to rotate relative thereto, to the first gear 18a on the input shaft 12. However, the first gear 18a is not rotationally fixed relative to the input shaft 12 and so does not transfer torque to the input shaft 12 upon being drivingly rotated.

Figure 3:
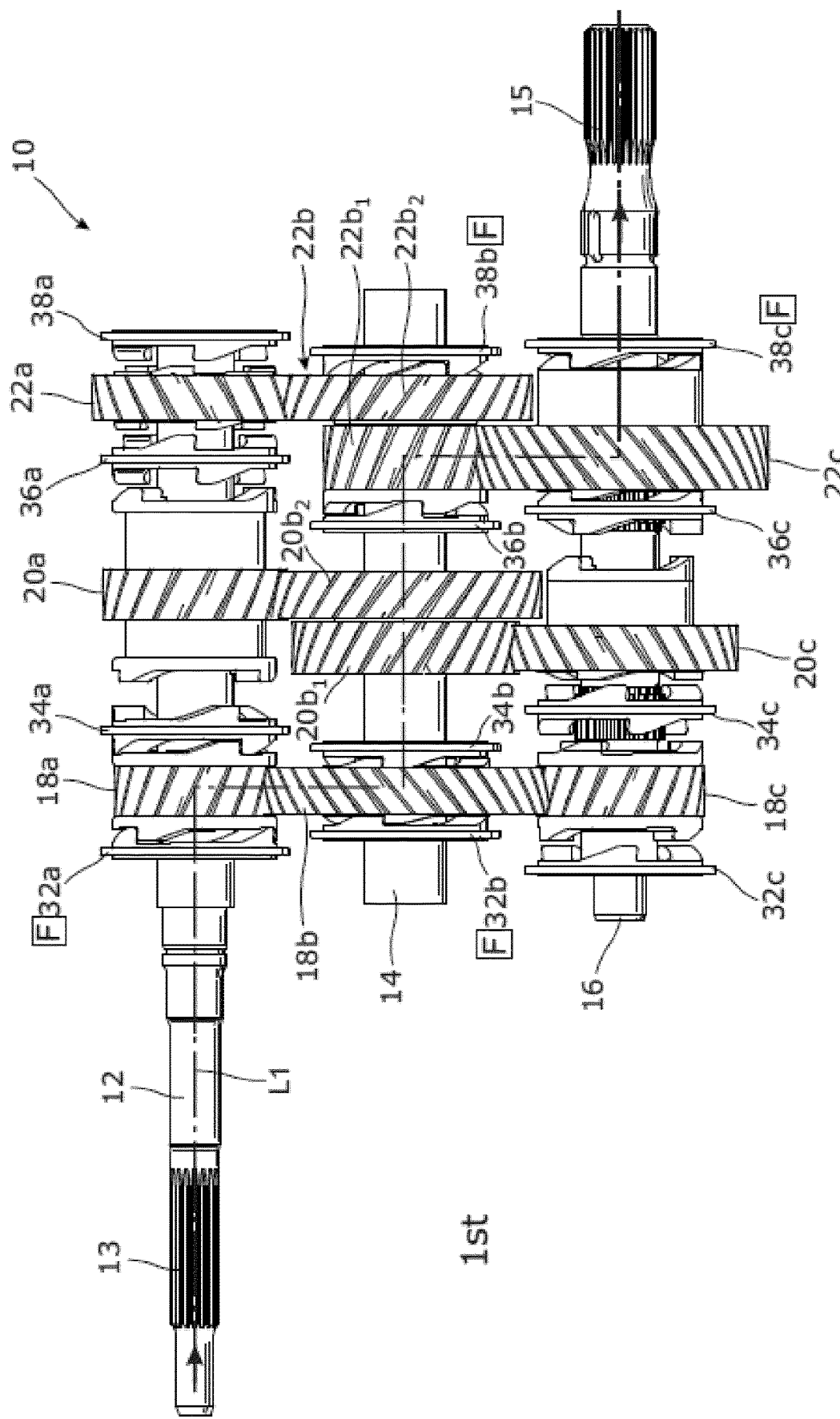
FIGS. 3 to 11 are schematic plan views of the transmission in FIG. 2b shown respectively in first to ninth selectable gear ratio configurations.

A change in the overall combination of gears rotationally fixed to respective shafts is required in order to progress from neutral (FIG. 2b) to the first selectable gear ratio configuration of the transmission 10 (FIG. 3).

Looking at FIG. 3, in the first selectable gear ratio configuration of the transmission 10 the gears selectively rotationally fixed to respective shafts include: the first gear 18a on the input shaft 12; the primary gear 18b on the bridging shaft 14; the quaternary gear 22b on the bridging shaft 14; and the third gear 22c on the output shaft 16—remembering that the secondary and tertiary gears $20b_1$, $20b_2$ on the bridging shaft are permanently rotationally fixed thereto. In this configuration when torque is applied to the torque input feature 13 the input shaft 12 and thus the first gear 18a are drivingly rotated. Due to the meshing engagement with the primary gear 18b on the bridging shaft torque is transferred thereto, which causes the bridging shaft 14 to rotate. The quaternary gear 22b on the bridging shaft 14 thus rotates, transferring torque to the third gear 22c on the output shaft 16 via a meshing engagement therewith; whereby torque is transferred through the output shaft 16 to the torque output feature 15 for rotatably driving components downstream in the vehicle powertrain.

The load path defined by the particular combination of gears rotationally fixed to the respective shafts in FIG. 3 is labelled L1. Second to ninth respective combinations of gears rotationally fixed to the different shafts—giving rise to second to ninth selectable gear ratio configurations of the transmission 10—are illustrated in FIGS. 4 to 11. Respective load paths defined by the different combinations of gears rotationally fixed to the shafts are labelled L2 to L9.

Remembering that only the secondary gear $20b_1$ and the tertiary gear $20b_2$ are permanently fixed to the bridging shaft 14, the other gears can be selectively rotationally fixed to the shaft on which they are mounted using the technique described in WO2014/049317A1; the contents of which are incorporated herein by reference. In particular as taught from page 9, line 12 to page 12, line 16 of WO02014/049317A1 a gear is selectively rotationally fixed to a shaft by moving dog hubs either side thereof into engagement with the gear. For completeness a general summary of the technique described in WO2014/049317A1 is as follows.

Figure 12:
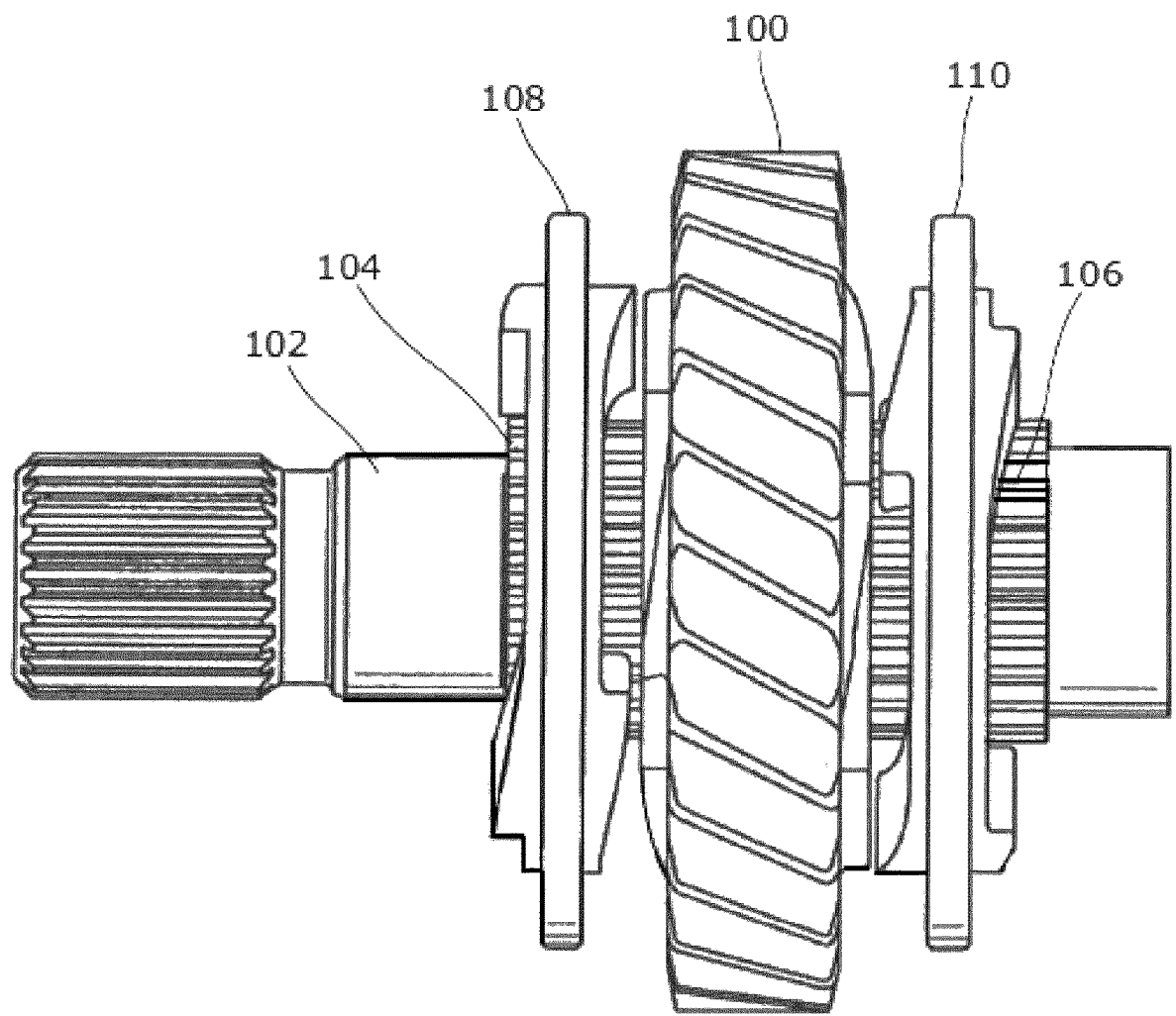
FIG. 12 is a schematic plan view of a known gear and associated dog hub arrangement shown in a disengaged configuration.
Figure 13:
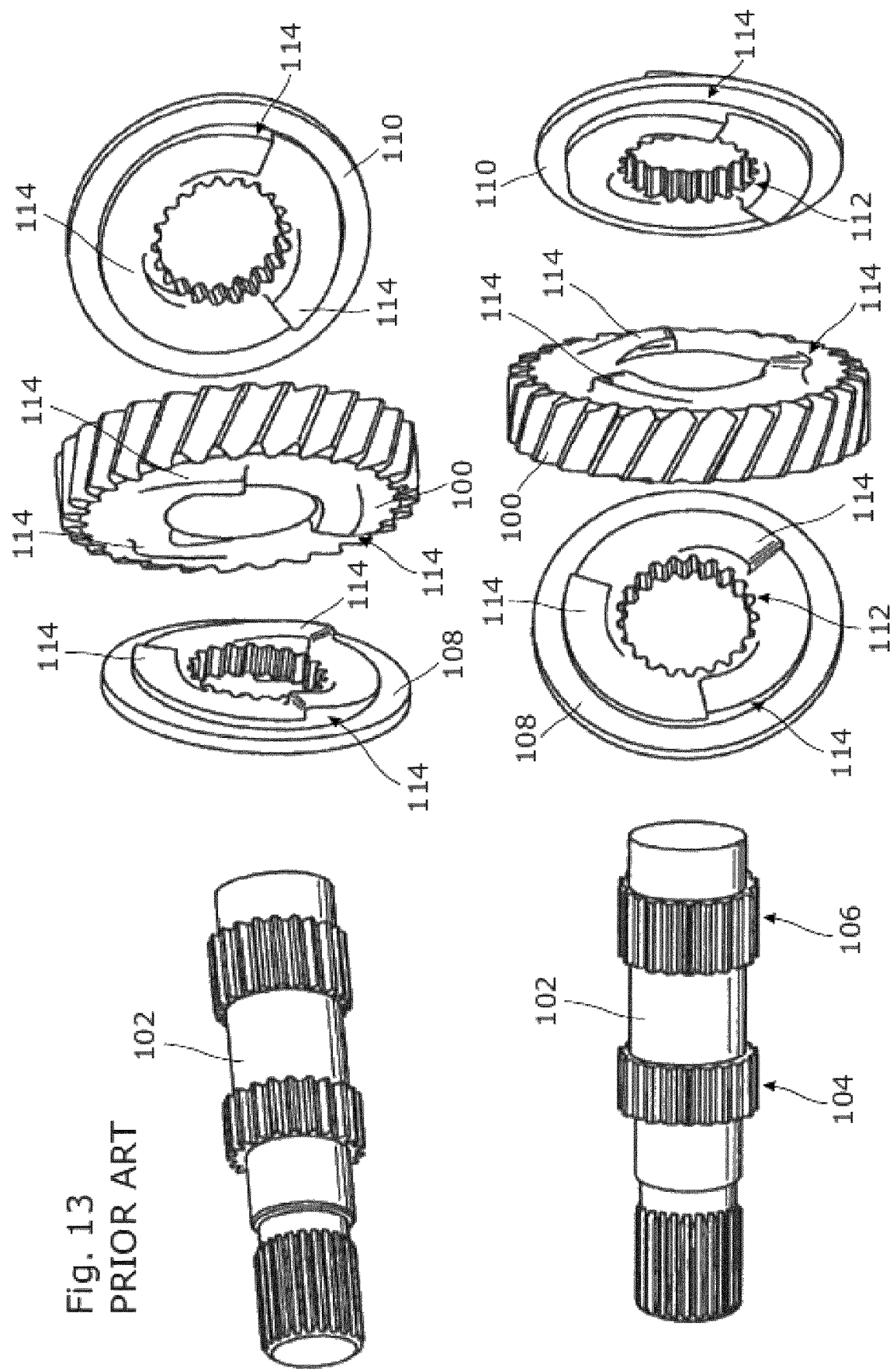
FIG. 13 depicts the features in FIG. 12 in exploded schematic view from different angles.

FIG. 12 shows a close up of a gear 100 carried by a shaft 102, like the first gear 18a carried by the input shaft 12 in FIG. 2b for instance. FIG. 13 is an exploded view of the components in FIG. 12 shown from different angles to illustrate the various features thereof. Now with reference to these drawings the gear 100 is mounted on the shaft 102 between two splined portions 104, 106. First and second selector members 108, 110 (otherwise referred to as dog hubs) are mounted on the splined portions 104, 106 on opposite sides of the gear 100. This is achieved by meshing a toothed portion 112 of each dog hub 108, 110 with the respective splined portions 104, 106. The dog hubs 108, no can be caused to slide along the shaft 102 but are rotationally fixed to it.

Respective ramp features 114 extend circumferentially around each side face of the two dog hubs 108, 110. In the embodiment illustrated three such ramp features, each terminating in a steeped end portion 114a, extend circumferentially around each side face of the two dog hubs in either a clockwise or anti-clockwise direction. Corresponding ramp features 114 extend circumferentially around each side face of the gear 100. In the embodiment illustrated three such ramp features 114, each terminating in a steeped end portion 114a, extend circumferentially around each side face of the gear 100 in a direction opposite to that of the immediately facing ramp features 114 on an adjacent dog hub 108, 110.

When the dog hubs 108, 110 are axially separated from the gear 100 as in FIG. 12, the gear 100 and shaft 102 can be rotated relative to each other. However, the gear 100 can be rotationally fixed to the shaft 102 by moving the dog hubs 108, 110 along the shaft 102 into engagement with the gear 100 as in FIG. 14, specifically by biasing the dog hubs 108, no towards the gear 100 to be engaged. Continuing with reference to FIG. 14, twisting the first dog hub 108 and the gear 100 in a first direction relative to each other while in engagement (e.g. by rotating the shaft 102 in the direction denoted A and thus causing the first dog hub 108 to rotate in direction A also; or alternatively by driving rotation of the gear 100 and causing it to be rotated in the direction denoted B) causes one such component to drive rotation the other due to the inter-engaging steeped end portions 114a of the interlocking ramp features 114. However, upon twisting the first dog hub 108 and gear 100 in the opposite direction relative to each other while in engagement, this will cause the ramped portions 114 of the respective components to ride over each other such that the first dog hub 108 and gear 100 are urged apart.

The forgoing similarly applies to the second dog hub 108 and ramp features 114 on the opposite side of the gear 100, although they are configured the other way around. In particular twisting the second dog hub 110 and gear 100 in a first direction relative to each other while in engagement (e.g. by rotating the input shaft 12 in the direction denoted B and thus causing the second dog hub 110 to rotate in direction B also; or alternatively by driving rotation of the gear 100 and causing it to be rotated in the direction denoted A) causes one such component to drive rotation of the other due to the inter-engaging steeped end portions 114a of the interlocking ramp features 114. However, upon twisting the second dog hub 110 and gear 100 in the opposite direction relative to each other while in engagement, this will cause the ramped portions 114 of the respective components to ride over each other such that the second dog hub 110 and gear 100 are urged apart.

A fuller description of the dog hubs used in the transmission 10 is now provided.

Looking back at FIG. 2b the input shaft 12 carries first to fourth dog hubs 32a, 34a, 36a, 38a. Moreover, these dog hubs are rotationally fixed relative to the input shaft 12 but can be moved along the length thereof as heretofore described. Depending on the position of the various dog hubs along the input shaft 12: the first dog hub 32a can transfer torque between the input shaft 12 and the first gear 18a; the second dog hub 34a can transfer torque between the input shaft 12 and either the first or second gear 18a, 20a; the third dog hub 36a can transfer torque between the input shaft 12 and either the second or third gear 20a, 22a; and the fourth dog hub 38a can transfer torque between the input shaft 12 and the third gear 22a.

The bridging shaft 14 carries first to fourth dog hubs 32b, 34b, 36b, 38b. Moreover, these dog hubs are rotationally fixed relative to the bridging shaft 14 but can be moved along the length thereof. Depending on the position of the various dog hubs along the bridging shaft 14: the first and second dog hubs 32b, 34b can each transfer torque between the bridging shaft 14 and the primary gear 18b; and the third and fourth dog hubs 36b, 38b can each transfer torque between the bridging shaft 14 and the quaternary gear 22b (which, it will be recalled, is a compound gear).

The output shaft 16 carries first to fourth dog hubs 32c, 34c, 36c, 38c. Moreover, these dog hubs are rotationally fixed relative to the output shaft 16 but can be moved along the length thereof. Depending on the position of the various dog hubs along the output shaft 16: the first dog hub 32c can transfer torque between the output shaft 16 and the first gear 18c; the second dog hub 34c can transfer torque between the output shaft 16 and either the first or second gear 18c, 20c; the third dog hub 36c can transfer torque between the output shaft 16 and either the second or third gear 20c, 22c; and the fourth dog hub 38c can transfer torque between the output shaft 16 and the third gear 22c.

Figure 14:
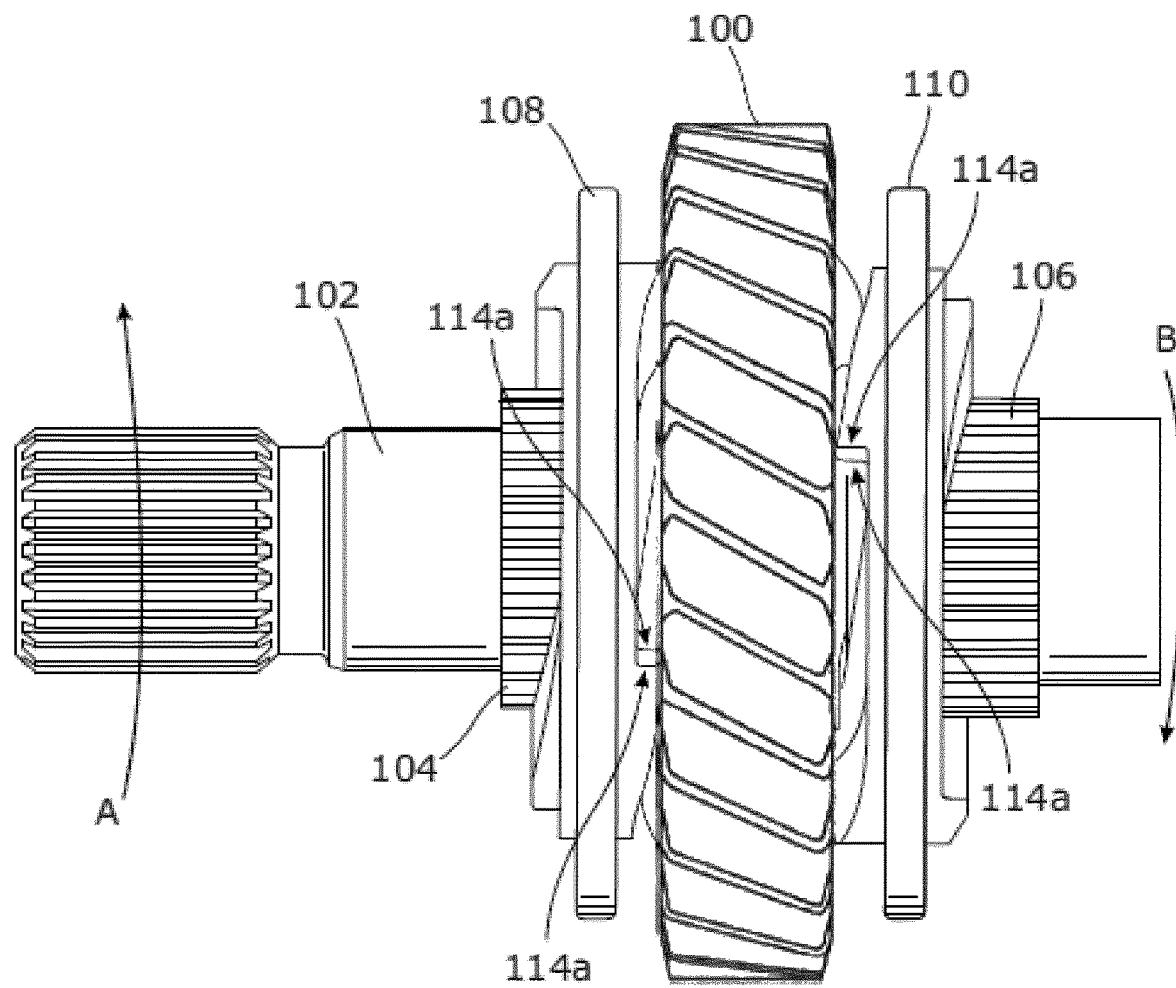
FIG. 14 is a schematic plan view of the arrangement in FIG. 12 shown in an engaged configuration.

As hinted earlier when discussing the arrangement depicted in FIG. 14, it is not usually the case that a dog hub drivingly rotates a gear because in some instances a gear drivingly rotates a dog hub. To explain this in more detail reference is made to FIG. 3. In a positive torque condition (i.e. when torque from an engine or motor is being transferred through the transmission 10 between the torque input feature 13 and the torque output feature 15 to components downstream in the vehicle powertrain) the first dog hub 32a on the input shaft 12 drivingly rotates the first gear 18a. Moreover, torque transferred from the torque input feature 13, through the input shaft 12 for causing the first dog hub 32a to rotate, which drivingly engages and thus causes rotation of the first gear 18a. However, turning attention to the third gear 22c on the output shaft 16 for instance, this gear drivingly rotates the fourth dog hub 38c. Moreover, torque is transferred from the quaternary gear 22b to the third gear 22c on the output shaft 16 which drivingly engages and so rotates the fourth dog hub 38c, which subsequently causes rotation of the output shaft 16 and the torque output feature 15.

A dog hub in engagement with a gear that is loaded only when the transmission is in a positive torque condition (i.e. when torque from an engine or motor is being transferred through the transmission 10 between the torque input feature 13 and the torque output feature 15 to components downstream in the vehicle powertrain) can be referred to as forward driving dog hub. Similarly a dog hub in engagement with a gear that is not loaded when the transmission is a positive torque condition can be referred to as a reverse driving dog hub, whereas such a dog hub only becomes loaded when the transmission is in a negative torque condition (e.g. when torque is being transferred through the transmission 10 from the torque output feature 15 to the torque input feature 13). To illustrate this by example, with continued reference to FIG. 3 the first dog hub 32a on the input shaft 12 and the fourth dog hub 38c on the output shaft 16 are forward driving dog hubs because they are loaded only when the transmission 10 is in a positive torque condition. However, the second dog hub 34a on the input shaft 12 and the third dog hub 36c on the output shaft 16 are reverse driving dog hubs because they are loaded only when the transmission 10 is in a negative torque condition. In the respective selectable gear ratio configurations illustrated in FIGS. 3 to 11, forward driving dog hubs are denoted "F".

A suitable technique for manipulating respective dog hubs and causing them to move into specific positions depending on a gear ratio to be selected is described between page 12, line 17 to page 15, line 32 of WO2014/0349317A1. Such a technique could be used to manipulate the dog hugs on the separate shafts of the transmission 10 into specific positions depending on a gear ratio to be selected, thereby giving rise to the aforementioned respective load paths (FIGS. 3 to 11). It is however acknowledged that various other techniques could be used to manipulate dog hubs into required positions depending on a gear ratio to be selected as mentioned on page 19, lines 10 to 18 of WO2014/049317A1.

The particular movements required to be made by the dog hubs of the transmission 10 in order to progress through the various selectable gear ratios will now be described.

Neutral to First

To progress from the neutral condition (FIG. 2*b*) in which no load path exists between the torque input and output features 13, 15 to the first selectable gear ratio configuration (FIG. 3): the third and fourth dog hubs 36*a*, 38*a* on the input shaft 12 are to be separated from engagement with the third gear 22*a*; and the first and second dog hubs 32*c*, 34*c* on the output shaft 16 are to be separated from engagement with the first gear 18*c*. Subsequently the first and second dog hubs 32*a*, 34*a* on the input shaft 12 are to be moved into engagement with the first gear 18*a*; the first and second dog hubs 32*b*, 34*b* on the bridging shaft 14 are to be moved into engagement with the primary gear 18*b*; the third and fourth dog hubs 36*b*, 38*b* on the bridging shaft 14 are to be moved into engagement with the quaternary gear 22*b*; and the third and fourth dog hubs 36*c*, 38*c* on the output shaft 16 are to be moved into engagement with the third gear 22*c*. Thereafter torque is transferred along the load path L1 between the torque input feature 13 and the torque output feature 15 when the input shaft 12 is rotatably driven in a forward rotational direction (i.e., when the transmission 10 is in a positive torque condition). In a reverse torque condition however, torque is transferred in the reverse direction along load path L1.

In more detail, when the first selectable gear ratio configuration (FIG. 3) has been engaged positive torque is transferred through the transmission 10 as follows. The torque input feature 13 is rotatably driven in a forward rotational direction (e.g. by an engine or motor)>the input shaft 12 operatively connected to the torque input feature 13 thus rotates at the same speed>this causes rotation of the first and second dog hubs 32*a*, 34*a* rotationally fixed thereto>the first dog hub 32*a* acting as a forward driving dog hub drivingly rotates the first gear 18*a*>torque is transferred to the primary gear 18*b* on the bridging shaft 14 via the meshing engagement therewith>the first dog hub 32*b* acting as the forward driving dog hub is rotatably driven by the primary gear 18*b*>this causes the bridging shaft 14 to rotate due to being rotationally fixed relative to the first dog hub 18*b*>the fourth dog hub 38*b* thus rotates with the bridging shaft 14 due to being rotationally fixed thereto>the fourth dog hub 38*b* acting as a forward driving dog hub rotatably drives the quaternary gear 22*b*>torque is transferred to the third gear 22*c* on the output shaft 16 via the meshing engagement therewith>the fourth dog hub 38*c* acting as a forward driving dog hub is rotatably driven by the third gear 22*c*>this causes the output shaft 16 to rotate due to being rotationally fixed relative to the third dog hub 38*c*>which causes the torque output feature 15 to rotate at the same speed due to being operatively connected to the output shaft 16>whereby the torque output feature 15 rotatably drives components downstream in the vehicle powertrain.

In the just described positive torque condition the second dog hub 34*a* on the input shaft 12, the second and third dog hubs 34*b*, 36*b* on the bridging shaft 14 and the third dog hub 36*c* on the output shaft 16 all act as reverse driving dog hubs; meaning that they are not loaded. However, in a reverse torque condition torque is transferred in the reverse direction along the load path L1, in which case the reverse driving dog hubs become loaded and the forward driving dog hubs are no longer loaded.

First to Second

Figure 4:
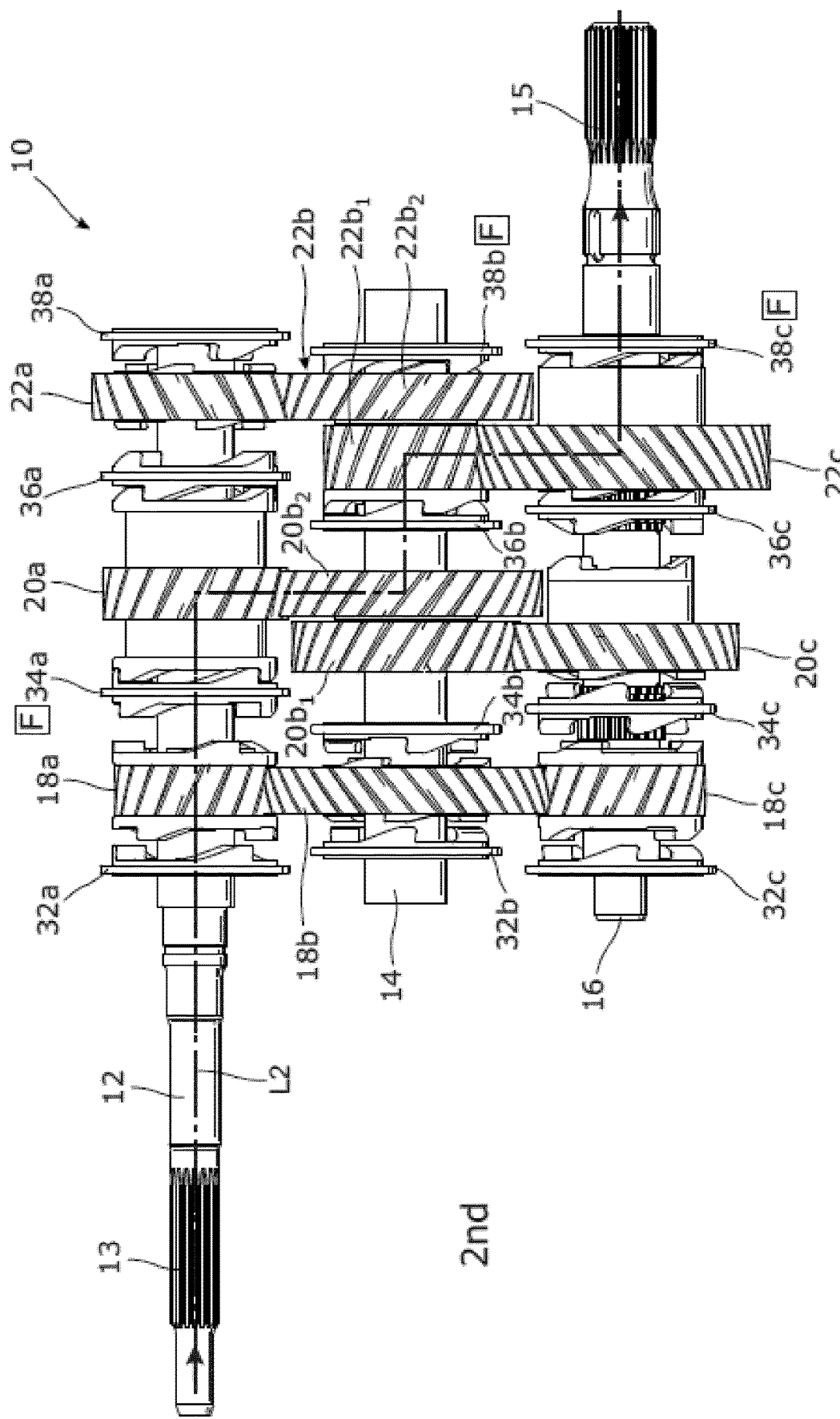

A change in the overall combination of gears rotationally fixed to the respective shafts is required in order to progress to the second selectable gear ratio configuration of the transmission 10 (FIG. 4). Moreover to progress from the first to the second selectable gear ratio configuration: the first and second dog hubs 32*a*, 34*a* on the input shaft 12 are to be separated from engagement with the first gear 18*a*; the first and second dog hubs 32*b*, 34*b* on the bridging shaft 14 are be separated from engagement with the primary gear 18*b*; and the second and third dog hubs 34*a*, 36*a* on the input shaft 12 are to be moved into engagement with the second gear 20*a*. However, the third and fourth dog hubs 36*b*, 38*b* on the bridging shaft 14 are to remain in engagement with the quaternary gear 22*b*; and the third and fourth dog hubs 36*c*, 38*c* on the output shaft 16 are to remain in engagement with the third gear 22*c*. Subsequently torque is transferred along the load path L2 between the torque input and output features 13, 15 when the input shaft 12 is rotatably driven in a forward rotational direction. In a reverse torque condition torque is transferred in the reverse direction along load path L2 between the torque output and input features 15, 13.

Variations in dog hub positions required to change from the first selectable gear ratio configuration (FIG. 3) to the second selectable gear ratio configuration (FIG. 4) while the transmission 10 is in a positive torque condition (i.e. while power is being transmitted along the vehicle powertrain via the transmission 10) will now be described in more detail. While the transmission is in the first selectable gear ratio configuration (FIG. 3) the second dog hub 34*a* on the input shaft 12 (acting as a reverse driving dog hub) is moved from engagement with the first gear 18*a* into engagement with the second gear 20*a*. When it engages and synchronises with the second gear 20*a* then the second dog hub 34*a* acts as a forward driving dog hub and so drivingly rotates the second gear 20*a*. Moreover the difference in gear ratio between: i) the interface between the second gear 20*a* on the input shaft 12 and the tertiary gear 20*b*$_2$ on the bridging shaft 14; and ii) the interface between the first gear 18*a* on the input shaft 12 and the primary gear 18*b* on the bridging shaft 14, is such that when torque is being transferred along the first load path L1 the second gear 20*a* on the input shaft 12 will be rotating slower than the first gear 18*a*—and so the second gear 20*a* will be rotating slower than the input shaft 12 itself. Thus, when the second dog hub 34*a* is urged against the second gear 20*a* it catches up (synchronises) with and begins to act as the forward driving dog hub for that gear and so becomes loaded by drivingly rotating the second gear 20*a*.

Following this the second gear 20*a* will rotate at the same speed as the input shaft 12, thus enabling the third driving dog hub 36*a* to fall into interlocking engagement therewith as in FIG. 14 with minimal backlash. The second gear 20*a* on the input shaft 12 has a bigger diameter than the first gear 18. Moreover the difference in gear ratio between: i) the interface between the second gear 20*a* on the input shaft 12 and the tertiary gear 20*b*$_2$ on the bridging shaft 14; and ii) the interface between the first gear 18a on the input shaft 12 and the primary gear 18b on the bridging shaft 14, is such that for a given rotational speed of the input shaft 12 the bridging shaft 14 will be caused to rotate faster when the second gear 20a is rotationally fixed to the input shaft 12 compared to when only the first gear 18a is rotationally fixed thereto.

When the second dog hub 34a begins to act as the forward driving dog hub of the second gear 20a, torque begins flowing along the load path L2 (see FIG. 4) between the torque input feature 13 and the torque output feature 15. Since the first dog hub 32a on the input shaft 12 and the first and second dog hubs 32b, 34b on the bridging shaft 12 are not loaded when torque starts flowing along load path L2 they are able to be moved out of engagement with the first gear 18a and the primary gear 18b.

In more detail, when the second selectable gear ratio configuration (FIG. 4) has been engaged, positive torque is transferred through the transmission 10 as follows. The torque input feature 13 is rotatably driven in a forward rotational direction (e.g. by an engine or motor)>the input shaft 12 operatively connected to the torque input feature 13 thus rotates at the same speed>this causes rotation of the second and third dog hubs 34a, 36a rotationally fixed thereto>the second dog hub 34a acting as a forward driving dog hub drivingly rotates the second gear 20a>torque is transferred to the tertiary gear 20b$_2$ on the bridging shaft 14 via the meshing engagement therewith>this causes the bridging shaft 14 to rotate due to being rotationally fixed relative to the tertiary gear 20b$_2$,>the fourth dog hub 38b thus rotates with the bridging shaft 14 due to being rotationally fixed thereto>the fourth dog hub 38b acting as a forward driving dog hub rotatably drives the quaternary gear 22b>torque is transferred to the third gear 22c on the output shaft 16 via the meshing engagement therewith>the fourth dog hub 38c acting as a forward driving dog hub is rotatably driven by the third gear 22c>this causes the output shaft 16 to rotate due to being rotationally fixed relative to the third dog hub 38c>which causes the torque output feature 15 to rotate at the same speed due to being operatively connected to the output shaft 16>whereby the torque output feature 15 rotatably drives components downstream in the vehicle powertrain.

In the just described positive torque condition the third dog hub 36a on the input shaft 12, the third dog hub 36b on the bridging shaft 14 and the third dog hub 36c on the output shaft 16 all act as reverse driving dog hubs; meaning that they are not loaded. However, in a reverse torque condition torque is transferred in the reverse direction along the load path L2, in which case the reverse driving dog hubs become loaded and the forward driving dog hubs are no longer loaded.

A shift from the first to second selectable gear ratio configuration gives rise to a step variation in resultant gear ratio between the torque input and output features 13, 15. In some embodiments such a shift from the first to second selectable gear ratio configuration could give rise to a variation of 1.23:1 in resultant gear ratio between the torque input and output features 13, 15.

An increase in rotational speed of the bridging shaft 14 following a shift into the second selectable gear ratio configuration (FIG. 4) results in a corresponding increase in rotational speed of the output shaft 16—and thus the torque output feature 15. As a result, for a given engine or motor speed the vehicle can be caused to travel at a greater speed than when the transmission was in the first selectable gear ratio configuration (FIG. 2b).

Second to Third

Figure 5:
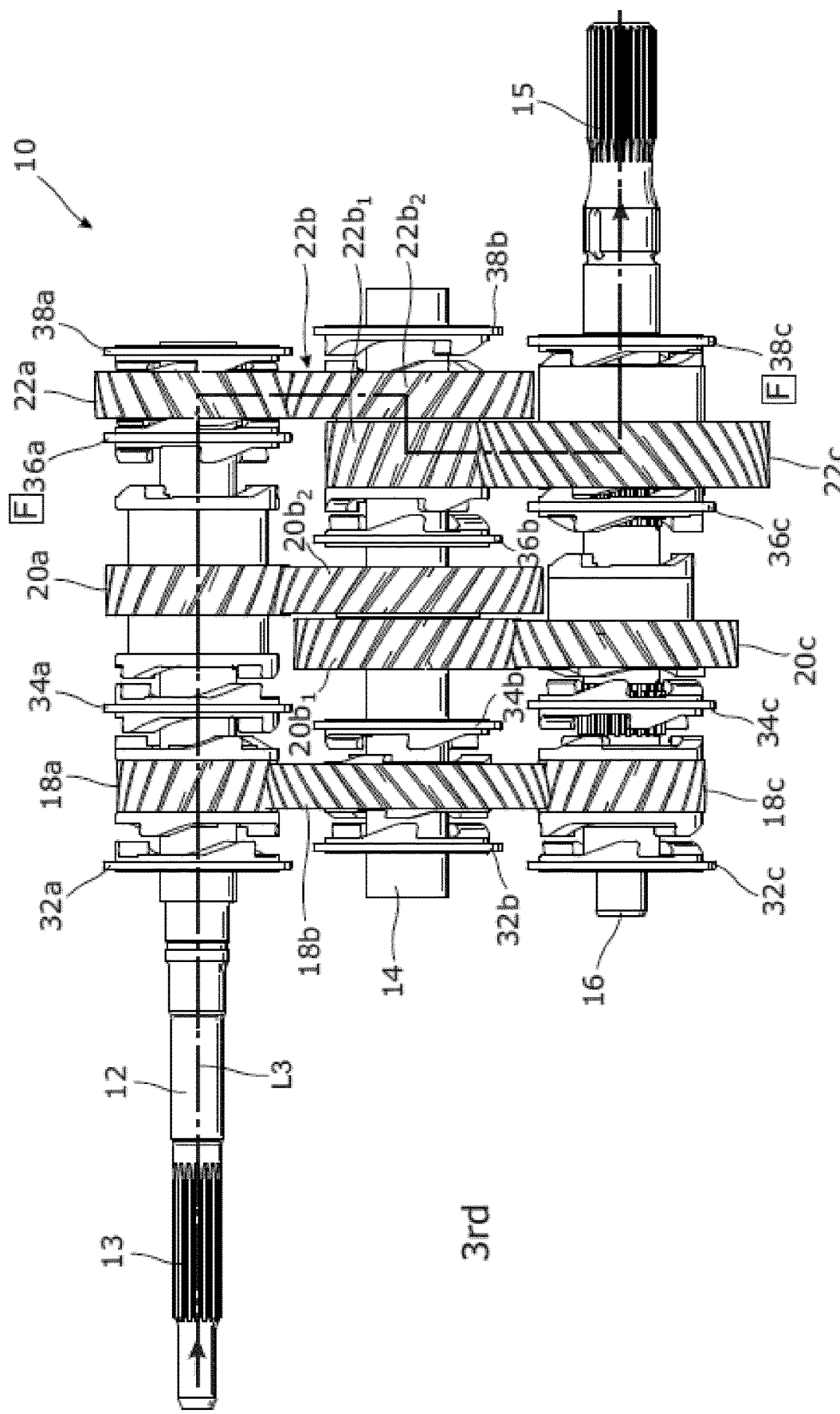

A change in the overall combination of gears rotationally fixed to respective shafts is required in order to progress to the third selectable gear ratio configuration of the transmission 10 (FIG. 5). Moreover to progress from the second to the third selectable gear ratio configuration: the second and third dog hubs 34a, 36a on the input shaft 12 are to be separated from engagement with the second gear 20a; the third and fourth hubs 36b, 38b on the bridging shaft 14 are be separated from engagement with the quaternary gear 22b; and the third and fourth dog hubs 36a, 38a on the input shaft 12 are to be moved into engagement with the third gear 22a. However, the third and fourth dog hubs 36c, 38c on the output shaft 16 are to remain in engagement with the third gear 22c. Subsequently torque is transferred along the load path L3 between the torque input and output features 13, 15 when the input shaft 12 is rotatably driven in a forward rotational direction. In a reverse torque condition torque is transferred in the reverse direction along load path L3 between the torque output and input features 15, 13.

Variations in dog hub positions required to change from the second selectable gear ratio configuration (FIG. 4) to the third selectable gear ratio configuration (FIG. 5) while the transmission 10 is in a positive torque condition (i.e. while power is being transmitted along the vehicle powertrain via the transmission 10) will now be described in more detail. While the transmission 10 is in the second selectable gear ratio configuration (FIG. 4) the third dog hub 36a on the input shaft 12 (acting as a reverse driving dog hub) is moved from engagement with the second gear 20a into engagement with the third gear 22a. When it engages and synchronises with the third gear 22a then the third dog hub 36a acts as a forward driving dog hub and so drivingly rotates the third gear 22a. Moreover the difference in gear ratio between: i) the interface between the third gear 22a on the input shaft 12 and the second (larger diameter) portion 22b$_2$ of the quaternary gear 22b on the bridging shaft 14; and ii) the interface between the second gear 20a on the input shaft 12 and the tertiary gear 20b$_2$ on the bridging shaft 14, is such that when torque is being transferred along the second load path L2 the third gear 22a on the input shaft 12 will be rotating slower than the second gear 20a—and so the third gear 22a will be rotating slower than the input shaft 12 itself. Thus, when the third dog hub 36a is urged against the third gear 22a it catches up (synchronises) with and begins to act as the forward driving dog hub for that gear and so becomes loaded by drivingly rotating the third gear 22a.

Following this the third gear 22a will rotate at the same speed as the input shaft 12, thus enabling the fourth dog hub 38a to fall into interlocking engagement therewith as in FIG. 14 with minimal backlash. The third gear 22a on the input shaft 12 has a bigger diameter than the second gear 20a. Moreover the difference in gear ratio between: i) the interface between the third gear 22a on the input shaft 12 and the second (larger diameter) portion 22b$_2$ of the quaternary gear 22b on the bridging shaft 14; and ii) the interface between the second gear 20a on the input shaft 12 and the tertiary gear 20b$_2$ on the bridging shaft 14, is such that for a given rotational speed of the input shaft 12 the bridging shaft 14 will be caused to rotate faster when the third gear 22a is rotationally fixed to the input shaft 12 compared to when only the second gear 20a is rotationally fixed thereto.

When the third dog hub 36a begins to act as the forward driving dog hub of the third gear 22a, torque begins flowing along the load path L3 (see FIG. 5) between the torque input feature 13 and the torque output feature 15. Since the second dog hub 34a on the input shaft 12 is not loaded when torque flows along load path L3 it can be moved out of engagement with the second gear 20a. Furthermore, since torque is transferred directly via the quaternary gear 22b and not along the bridging shaft 14, the third and fourth dog hubs 36b, 38b are not loaded when torque is transferred along the load path L3 and so are able to be moved out of engagement with the quaternary gear 22b.

In more detail, when the third selectable gear ratio configuration (FIG. 5) has been engaged positive torque is transferred through the transmission 10 as follows. The torque input feature 13 is rotatably driven in a forward rotational direction (e.g. by an engine or motor)>the input shaft 12 operatively connected to the torque input feature 13 thus rotates at the same speed>this causes rotation of the third and fourth dog hubs 36a, 38a rotationally fixed thereto>the third dog hub 36a acting as a forward driving dog hub drivingly rotates the third gear 22a>torque is transferred to the second (larger diameter) portion $22b_2$ of the quaternary gear 22b on the bridging shaft 14 via the meshing engagement therewith>this causes the first (reduced diameter) portion $22b_1$ of the quaternary gear 22b to rotate also>torque is transferred to the third gear 22c on the output shaft 16 via the meshing engagement therewith>the fourth dog hub 38c acting as a forward driving dog hub is rotatably driven by the third gear 22c>this causes the output shaft 16 to rotate due to being rotationally fixed relative to the third dog hub 38c>which causes the torque output feature 15 to rotate at the same speed due to being operatively connected to the output shaft 16>whereby the torque output feature 15 rotatably drives components downstream in the vehicle powertrain.

In the just described positive torque condition the fourth dog hub 38a on the input shaft 12 and the third dog hub 36c on the output shaft 16 both acts as reverse driving dog hubs; meaning that they are not loaded. However, in a reverse torque condition torque is transferred in the reverse direction along the load path L3, in which case the reverse driving dog hubs become loaded and the forward driving dog hubs are no longer loaded.

A shift from the second to third selectable gear ratio configuration gives rise to another step variation in resultant gear ratio between the torque input and output features 13, 15. In some embodiments such a shift from the second to third selectable gear ratio configuration could also give rise to a variation of 1.23:1 in resultant gear ratio between the torque input and output features 13, 15.

An increase in rotational speed of the bridging shaft 14 following a shift into the third selectable gear ratio configuration (FIG. 5) results in a corresponding increase in rotational speed of the output shaft 16—and thus the torque output feature 15. As a result, for a given engine or motor speed the vehicle can be caused to travel at a greater speed than when the transmission was in the second or first selectable gear ratio configuration (FIG. 4).

Third to Fourth

Figure 6:
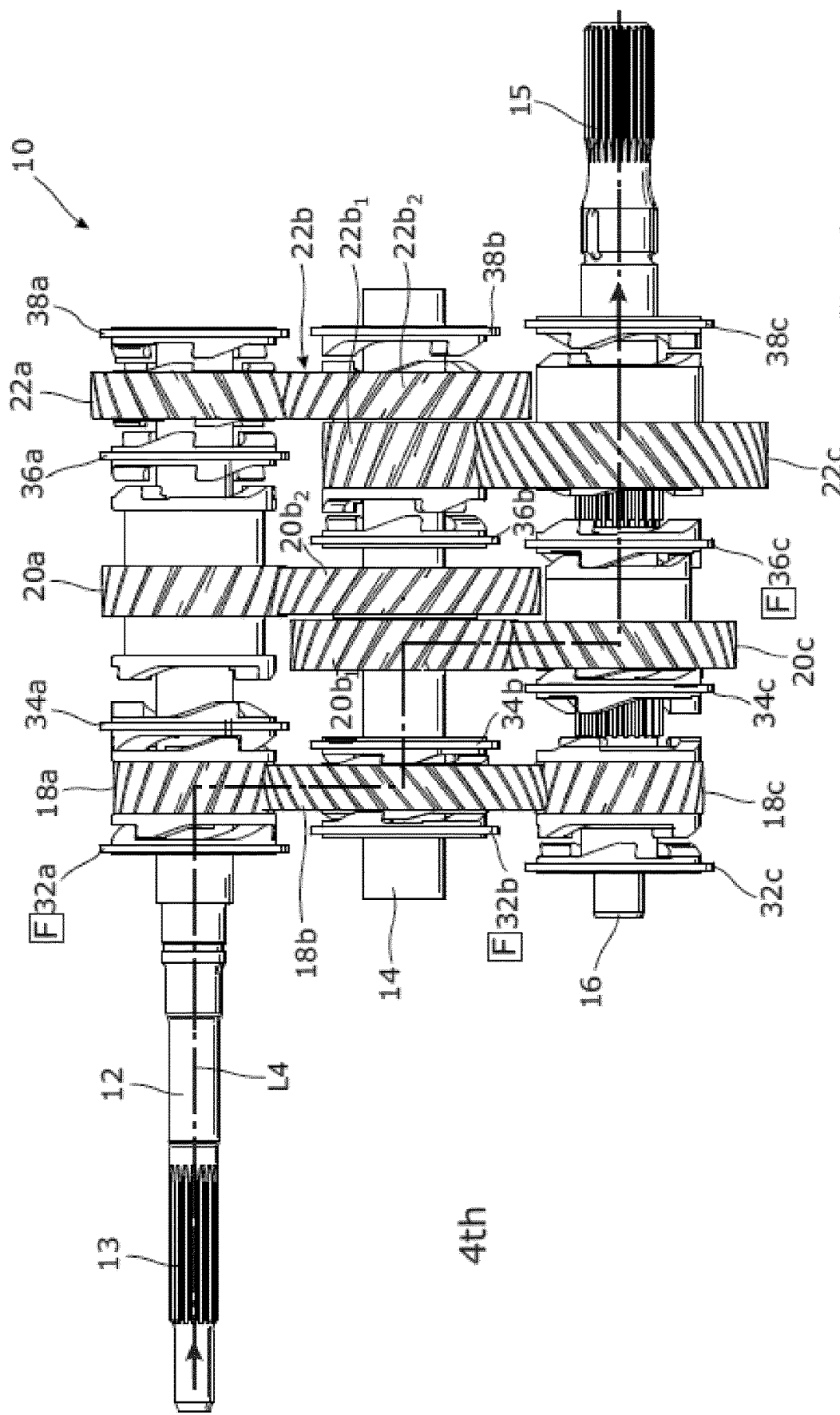

A change in the overall combination of gears rotationally fixed to respective shafts is required in order to progress to the fourth selectable gear ratio configuration of the transmission 10 (FIG. 6). Moreover to progress from the third to the fourth selectable gear ratio configuration: the third and fourth dog hubs 36a, 38a on the input shaft 12 are to be separated from engagement with the third gear 20a; the third and fourth hubs 36c, 38c on the output shaft 16 are be separated from engagement with the third gear 22c; the first and second dog hubs 32a, 34a on the input shaft 12 are to be engaged with the first gear 18a; the first and second dog hubs 32b, 34b on the bridging shaft 12 are to be engaged with the primary gear 18b; and the second and third dog hubs 34c, 36c on the output shaft 16 are to be engaged with the second gear 20c. Subsequently torque is transferred along the load path L4 between the torque input and output features 13, 15 when the input shaft 12 is rotatably driven in a forward rotational direction. In a reverse torque condition torque is transferred in the reverse direction along load path L4 between the torque output and input features 15, 13.

Variations in dog hub positions required to change from the third selectable gear ratio configuration (FIG. 5) to the fourth selectable gear ratio configuration (FIG. 6) while the transmission is in a positive torque condition (i.e. while power is being transmitted along the vehicle powertrain via the transmission 10) will now be described in more detail. While the transmission is in the third selectable gear ratio configuration (FIG. 5) the fourth dog hub 38a on the input shaft 12 (acting as a reverse driving dog hub) is moved from engagement with the third gear 22a, which is enabled due to the fourth dog hub 38a being a reverse driving dog hub and so not loaded in a positive torque condition of the transmission 10. Subsequently the first and second dog hubs 32a, 34a on the input shaft 12 are moved into engagement with the first gear 18a; the first and second dog hubs 32b, 34b on the bridging shaft 14 are moved into engagement with the primary gear 18b; and the second and third dog hubs 34c, 36c on the output shaft 16 are moved into engagement with the second gear 20c; whereby the third dog hub 36c on the output shaft 16 can be separated from the third gear 22c while positive torque is being transferred along the load path L3 due to its also being a reverse driving dog hub. Torque will thus begin flowing along load path L4 instead of L3.

Subsequently the third dog hub 36a on the input shaft 12 and the fourth dog hub 38c on the output shaft 16 will no longer be loaded due to torque flowing along load path L4 and so can be removed from engagement with the third gear 22a on the input shaft 12 and third gear 22c on the output shaft 16.

More specifically during an upshift from the third selectable gear ratio configuration (FIG. 5) to the fourth selectable gear ratio configuration (FIG. 6), only after each of the forward driving dog hubs of the fourth selectable gear ratio configuration (in other words, all of such forward driving dog hubs) have synchronised with the gears into which they are respectively moved into contact with will torque start flowing along load path L4 instead on L3. Such forward driving dog hubs being: the first dog hub 32a on the input shaft 12; the first dog hub 32b on the bridging shaft 14; and the third dog hub 36c on the output shaft 16. Now with regards to the reverse driving dog hubs of the fourth selectable gear ratio configuration (FIG. 6), when a forward driving dog hub thereof synchronises with its respective gear as described then the corresponding reverse driving dog hub will fall into interlocking engagement with that gear as well with minimal backlash. In this manner the reverse driving dog hubs of the fourth selectable gear ratio configuration are engaged, such dog hubs being: the second dog hub 34a on the input shaft 12; the secondary dog hub 34b on the bridging shaft 14; and the secondary dog hub 34c on the output shaft 16.

To avoid a lockup condition of the transmission 10 while upshifting from the third to fourth selectable gear ratio configuration, the reverse driving dog hub of the third gear 22a on the input shaft 12 (i.e. the fourth dog hub 38a) must or should be disengaged from contact with the third gear 22a before the forward driving dog hub of the first gear 18a on the input shaft 12 (i.e. the first dog hub 32a) is engaged with the first gear 18a. One way of achieving this is to provide a mechanical connection between the first dog hub 32a and the fourth dog 38a on the input shaft 12 such that if one moves to the left or right so does the other and vice versa. In this manner both cannot be engaged at the same time because moving say the first dog hub 32a to the right in order to engage it with the first gear 18a on the input shaft 12 moves the fourth dog hub 38a also to the right but away from the third gear 22a. It is appreciated that other ways of achieving the same effect are possible and will be apparent to those of ordinary skill in the art having read the foregoing disclosure.

It does not matter in which order the forward driving dog hubs of the fourth selectable gear ratio configuration move into contact and synchronise with the first gear on the output shaft 18a, the primary gear 18b on the bridging shaft 14 and the second gear 20c on the output shaft 16 respectively. However as mentioned previously, only after each such forward driving dog hub has synchronised with the gear into which it is moved into contact with will torque start flowing along load path L4.

The order of synchronisation mentioned above is likely to differ depending on the specific configuration of the transmission 10. For instance, different mechanisms used to manipulate changes in dog hub positions could cause the forward driving dog hubs of the fourth selectable gear ratio configuration to come into contact with respective gears at slightly different times. Furthermore, differences in the extent of friction provided by bearings coupling gears to shafts could cause the forward driving dog hubs of the fourth selectable gear ratio to synchronise with respective gears at slightly different times Continuing with the extent of friction experienced by bearings, in some transmissions 10 bearings could experience enough friction such that even when gears are not engaged by dog hubs these gears experience a torque and are essentially dragged by the shaft on which they are mounted to rotate. This could cause some gears, even when not engaged by dog hubs, to rotate at substantially the same speed as the shaft on which they are mounted unless forced otherwise e.g. by another gear in mesh therewith that is rotating at another speed. In other transmissions 10 however the friction experienced by bearings could be less so that gears essentially free-wheel unless engaged by dog hubs. The degree of friction experienced by bearings affects the degree of synchronization required when implementing gear shifts. For instance in shifting between the third and fourth selectable gear ratios, it will be apparent from FIG. 5 that the first gear 18a on the input shaft 12, the primary gear 18b on the bridging shaft 14 and the first gear 18c on the output shaft are only coupled to their respective shafts by the bearings mounting them thereto—they are not rotationally coupled to the shafts by dog hubs. As such, if the friction provided by such bearings is sufficiently low and the third gear ratio configuration (FIG. 5) is engaged for a sufficient length of time then the essentially freewheeling gears will slow down. As a result, when subsequently upshifting into the fourth selectable gear ratio configuration (FIG. 6) a higher degree of synchronization will be required by the first dog hub 32a on the input shaft 12 and the first dog hub 32b on the bridging shaft 14 than had the first gear 18a on the input shaft 12 and the primary gear 18b on the bridging shaft 14 been rotating closer to the rotational speeds of such shafts due to the friction provided by the bearings on which they are mounted.

Requiring less synchronisation as heretofore described provides that smoother gearshifts are achievable, so improving vehicle and driver passenger comfort.

More specific details of an exemplary upshift operation between the third and fourth selectable gear ratio configurations is now provided.

Since the first gear 18a on the input shaft 12 is free to rotate relative to the input shaft 12 while the transmission 10 is in the third selectable gear ratio configuration (FIG. 5), upon shifting to the fourth gear ratio configuration (FIG. 6) the input shaft 12—and thus the first dog hub 32a rotationally fixed to it—will be rotating faster than the first gear 18a. Therefore, in a positive torque condition of the transmission 10, as the first dog hub 18a is urged against the first gear 32a it will catch up (synchronise) with that gear and so become loaded and begin drivingly rotating the first gear 18a; in other words, it will act as a forward driving dog hub.

After this the first gear 18a will rotate at the same speed as the input shaft 12, thus enabling the second dog hub 34a to fall into interlocking engagement therewith as in FIG. 14 with minimal backlash. Due to the meshing engagement with the first gear 18a on the input shaft 12, the primary gear 18b on the bridging shaft 14 is drivingly rotated. The first dog hub 32b on the bridging shaft 14 acting as a forward driving dog hub will thus become drivingly engaged by the primary gear 18b as it rotates, after which the bridging shaft 14 will be caused to rotate at the same speed as the primary gear 18l). This enables the second dog hub 34b, acting as a reverse driving dog hub, to fall into interlocking engagement with the primary gear 18b as in FIG. 14.

The secondary gear $20b_1$ on the bridging shaft 14 has a bigger diameter than the first (reduced diameter) portion $22b_1$ of the quaternary gear 22b. Moreover the difference in gear ratio between: i) the interface between the secondary gear $20b_1$ on the bridging shaft 14 and the second gear 20c on the output shaft 16; and ii) the interface between the first (reduced diameter) portion 22b, of the quaternary gear 22b on the bridging shaft 14 and the third gear 22c on the output shaft 16, is such that for a given rotational speed of the bridging shaft 14 the second gear 20c on the output shaft 16 is driven faster than the third gear 22c. As such the second gear 20c will be caused catch up (synchronise) with and drivingly rotate the third dog hub 36c which will thus become loaded and act as a forward driving dog hub, whereby torque will subsequently flow along the load path L4 (see FIG. 6) between the torque input feature 13 and the torque output feature 15.

After this the second gear 20c on the output shaft 16 will rotate at the same speed as the output shaft 16, thus enabling the second dog hub 34c on the output shaft 16 to fall into interlocking engagement therewith as in FIG. 14 with minimal backlash. Since the third dog hub 36a on the input shaft 12 does not sit in the load path L5 it is no longer loaded when torque begins flowing along load path L4 and so can be moved out of engagement with the second gear 20a. Furthermore, since the output shaft 12 will be rotating faster than the third gear 22c, the fourth dog hub 38c is pushed out of engagement therewith because of the heretofore described ramped portions of these components being caused to ride over each other.

When the fourth selectable gear ratio configuration (FIG. 6) has been engaged positive torque is transferred through the transmission 10 as follows. The torque input feature 13 is rotatably driven in a forward rotational direction (e.g. by an engine or motor)>the input shaft 12 operatively connected to the torque input feature 13 thus rotates at the same speed>this causes rotation of the first and second dog hubs 32a, 34a rotationally fixed thereto>the first dog hub 34a acting as a forward driving dog hub drivingly rotates the first gear 18a>torque is transferred to the primary gear 18b on the bridging shaft 14 via the meshing engagement therewith>the first dog hub 32b acting as the forward driving dog hub is rotatably driven by the primary gear 18b>this causes the bridging shaft 14 to rotate due to being rotationally fixed relative to the first dog hub 32b>the secondary gear rotationally fixed to the bridging shaft 14 thus rotates>torque is then transferred to the second gear 20c on the output shaft 16 via the meshing engagement therewith>the third dog hub 36c acting as a forward driving dog hub is rotatably driven by the second gear 20c>this causes the output shaft 16 to rotate due to being rotationally fixed relative to the third dog hub 36c>which causes the torque output feature 15 to rotate at the same speed due to being operatively connected to the output shaft 16>whereby the torque output feature 15 rotatably drives components downstream in the vehicle power train.

In the just described positive torque condition the second dog hub 34a on the input shaft 12, the second dog hub 34b on the bridging shaft 14 and the second dog hub 34c on the output shaft 16 act as reverse driving dog hubs; meaning that they are not loaded. However, in a reverse torque condition torque is transferred in the reverse direction along the load path L4, in which case the reverse driving dog hubs become loaded and the forward driving dog hubs are no longer loaded.

It will be noted that a shift from the third to fourth selectable gear ratio configuration involves a block shift along the input shaft 12 and a single shift along the output shaft 16. The difference in gear ratio between: i) the interface between the secondary gear $20b_1$ on the bridging shaft 14 and the second gear 20c on the output shaft 16; and ii) the interface between the first (reduced diameter) portion $22b_1$ of the quaternary gear 22b on the bridging shaft 14 and the third gear 30c on the output shaft 16, is equivalent to three step changes in resultant gear ratio described up to now (i.e. three times the step in resultant gear ratio caused by shifting from the first to second or second to third heretofore described gear ratio configurations). However this coupled with the difference in gear ratio between: i) the interface between the third gear 22a on the input shaft 12 and the second (larger diameter) portion $22b_2$ of the quaternary gear 22b on the bridging shaft 14; and ii) the interface between the first gear 18a on the input shaft 12 and the primary gear 18b on the bridging shaft, provides that upon shifting from the third to fourth gear ratio configuration of the transmission 10 the change in resultant gear ratio experienced between the torque input and output features 13, 15 is equivalent to a single step change in gear ratio configuration (i.e. equivalent to the step change caused by shifting from $1^{st}$ to $2^{nd}$, or $2^{nd}$ to $3^{rd}$ as heretofore described).

Moreover, in some embodiments a shift from the third to fourth selectable gear ratio configuration could give rise to a variation of 1.23:1 in resultant gear ratio between the torque input and output features 13, 15.

Due to the increase in rotational speed of the output shaft 16 following a shift into the fourth selectable gear ratio configuration (FIG. 6), for a given engine or motor speed the vehicle can be caused to travel at a greater speed than when the transmission was in the third or any other previous selectable gear ratio configuration.

Fourth to Fifth

Figure 7:
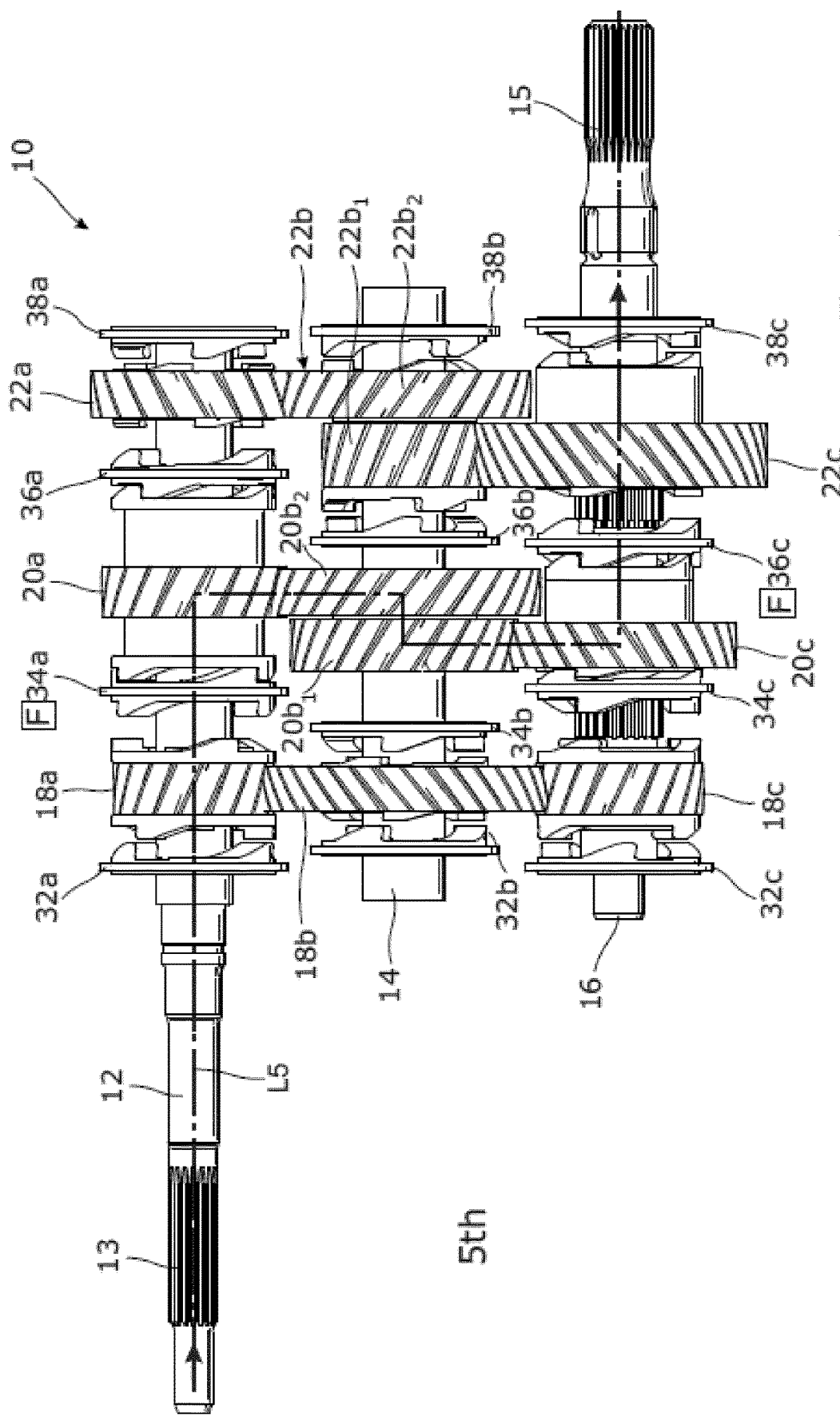

A change in the overall combination of gears rotationally fixed to respective shafts is required in order to progress to the fifth selectable gear ratio configuration of the transmission 10 (FIG. 7). Moreover to progress from the fourth to the fifth selectable gear ratio configuration: the first and second dog hubs 32a, 34a on the input shaft 12 are to be separated from engagement with the first gear 18a; the first and second dog hubs 32b, 34b on the bridging shaft 14 are to be separated from engagement with the primary gear 18b; and the second and third dog hubs 34a, 36a on the input shaft 12 are to be moved into engagement with the second gear 20a. However, the second and third dog hubs 34c, 36c on the output shaft 16 are to remain in engagement with the second gear 20c. Subsequently torque is transferred along the load path L5 between the torque input and output features 13, 15 when the input shaft 12 is rotatably driven in a forward rotational direction. In a reverse torque condition torque is transferred in the reverse direction along load path L5 between the torque output and input features 15, 13.

Variations in dog hub positions required to change from the fourth selectable gear ratio configuration (FIG. 6) to the fifth selectable gear ratio configuration (FIG. 7) while the transmission is in a positive torque condition (i.e. while power is being transmitted along the vehicle powertrain via the transmission 10) will now be described in more detail. While the transmission is in the fourth selectable gear ratio configuration (FIG. 6) the second dog hub 34a on the input shaft 12 (acting as a reverse driving dog hub) is moved from engagement with the first gear 18a into engagement with the second gear 20a. When it engages and synchronises the second gear 20a the second dog hub 34a acts as a forward driving dog hub and so drivingly rotates the second gear 20a. Moreover the difference in gear ratio between: i) the interface between the second gear 20a on the input shaft 12 and the tertiary gear $20b_2$ on the bridging shaft 14; and ii) the interface between the first gear 18a on the input shaft 12 and the primary gear 18b on the bridging shaft 14, is such that when torque is being transferred along the first load path L4 the second gear 20a on the input shaft 12 will be rotating slower than the first gear 18a—and so the second gear 20a will be rotating slower than the input shaft 12 itself. Thus when the second dog hub 34a is urged against the second gear 20a it catches up (synchronises) with and begins to act as the forward driving dog hub for that gear and so becomes loaded by drivingly rotating the second gear 20.

Following this the second gear 20a will rotate at the same speed as the input shaft 12, thus enabling the third dog hub 28a to fall into interlocking engagement therewith as in FIG. 14 with minimal backlash. The second gear 20a on the input shaft 12 has a bigger diameter than the first gear 18. Moreover the difference in gear ratio between: i) the interface between the second gear 20a on the input shaft 12 and the tertiary gear $20b_2$ on the bridging shaft 14; and ii) the interface between the first gear 18a on the input shaft 12 and the primary gear 18b on the bridging shaft 14, is such that for a given rotational speed of the input shaft 12 the bridging shaft 14 will be caused to rotate faster when the second gear 20a is rotationally fixed to the input shaft 12 compared to when only the first gear 18a is rotationally fixed thereto.

When the second dog hub 34a begins to act as the forward driving dog hub of the second gear 20a, torque begins flowing along the load path L5 (see FIG. 7) between the torque input feature 13 and the torque output feature 15. Since the first dog hub 32a on the input shaft 12 and the first and second dog hubs 32b, 34b on the bridging shaft 12 are not loaded when torque flows along the load path L5 they are able to be moved out of engagement with the first gear 18a and the primary gear 18b.

In more detail, when the fifth selectable gear ratio configuration (FIG. 7) has been engaged, positive torque is transferred through the transmission 10 as follows. The torque input feature 13 is rotatably driven in a forward rotational direction (e.g. by an engine or motor)>the input shaft 12 operatively connected to the torque input feature 13 thus rotates at the same speed>this causes rotation of the second and third dog hubs 34a, 36a rotationally fixed thereto>the second dog hub 34a acting as a forward driving dog hub drivingly rotates the second gear 20a>torque is transferred to the tertiary gear $20b_2$ on the bridging shaft 14 via the meshing engagement therewith>this causes the bridging shaft 14 to rotate due to being rotationally fixed relative to the tertiary gear $20b_2$>the secondary gear $20b_1$ on the bridging shaft 14 thus rotates>torque is transferred to the second gear 20c on the output shaft 16 via the meshing engagement therewith>the third dog hub 36c acting as a forward driving dog hub is rotatably driven by the second gear 20c>this causes the output shaft 16 to rotate due to being rotationally fixed relative to the third dog hub 36c>which causes the torque output feature 15 to rotate at the same speed due to being operatively connected to the output shaft 16>whereby the torque output feature 15 rotatably drives components downstream in the vehicle powertrain.

In the just described positive torque condition the third dog hub 36a on the input shaft 12 and the second dog hub 34c on the output shaft 16 act as reverse driving dog hubs; meaning that they are not loaded. However, in a reverse torque condition torque is transferred in the reverse direction along the load path L5, in which case the reverse driving dog hubs become loaded and the forward driving dog hubs are no longer loaded.

A shift from the fourth to fifth selectable gear ratio configuration gives rise to a step variation in resultant gear ratio between the torque input and output features 13, 15. In some embodiments such a shift from the fourth to fifth selectable gear ratio configuration could give rise to a variation of 1.23:1 in resultant gear ratio between the torque input and output features 13, 15.

An increase in rotational speed of the bridging shaft 14 following a shift into the fifth selectable gear ratio configuration (FIG. 7) results in a corresponding increase in rotational speed of the output shaft 16—and thus the torque output feature 15. As a result, for a given engine or motor speed the vehicle can be caused to travel at a greater speed than when the transmission was in the fourth or any other previous selectable gear ratio configuration.

Fifth to Sixth

Figure 8:
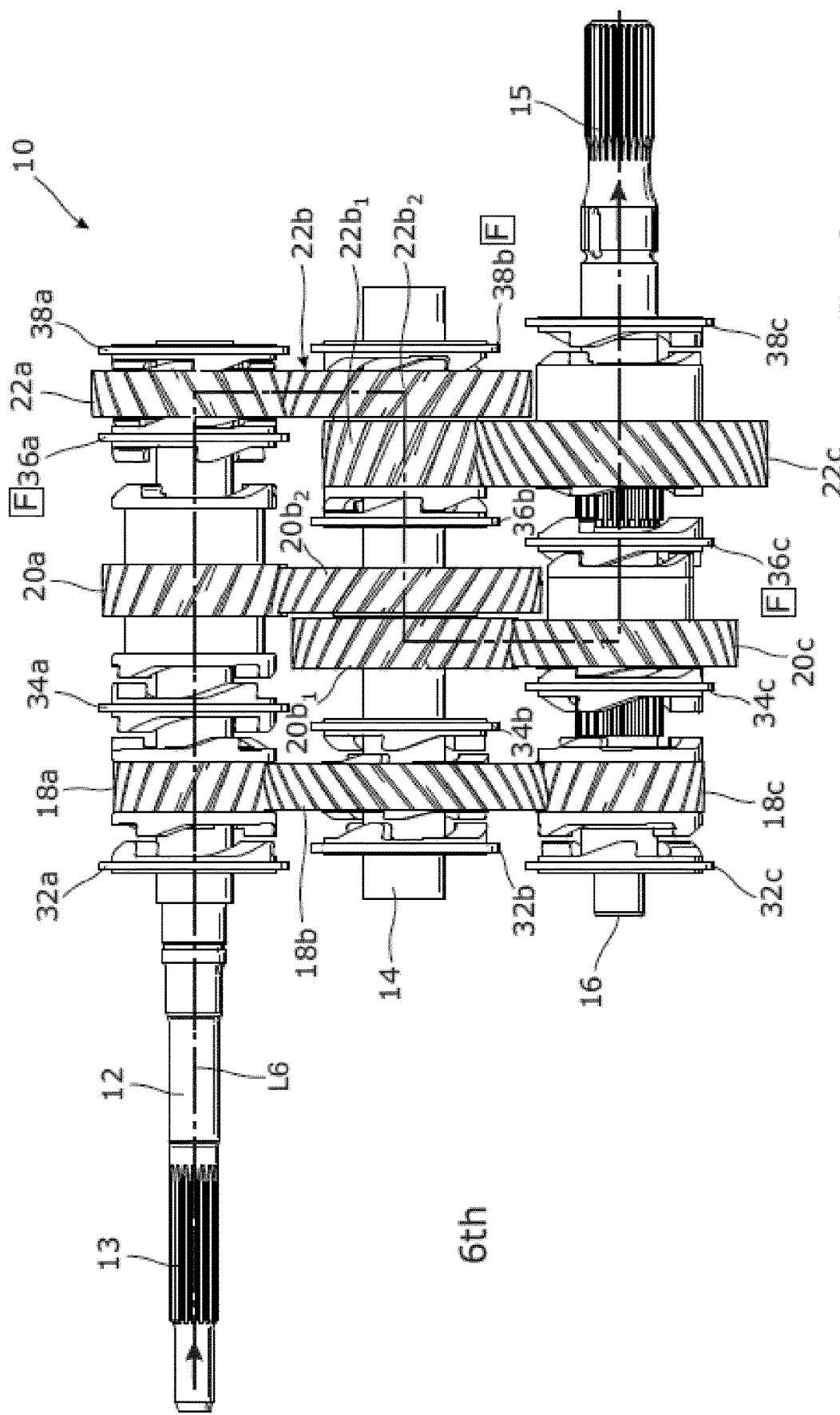

A change in the overall combination of gears rotationally fixed to respective shafts is required in order to progress to the sixth selectable gear ratio configuration of the transmission 10 (FIG. 8). Moreover to progress from the fifth to the sixth selectable gear ratio configuration: the second and third dog hubs 34a, 36a on the input shaft 12 are to be separated from engagement with the second gear 20a; the third and fourth hubs 36b, 38b on the bridging shaft 14 are be moved into engagement with the quaternary gear 22b; and the third and fourth dog hubs 36a, 38a on the input shaft 12 are to be moved into engagement with the third gear 22a. However, the second and third dog hubs 34c, 36c on the output shaft 16 are to remain in engagement with the second gear 20c. Subsequently torque is transferred along the load path L6 between the torque input and output features 13, 15 when the input shaft 12 is rotatably driven in a forward rotational direction. In a reverse torque condition torque is transferred in the reverse direction along load path L6 between the torque output and input features 15, 13.

Variations in dog hub positions required to change from the fifth selectable gear ratio configuration (FIG. 7) to the sixth selectable gear ratio configuration (FIG. 8) while the transmission is in a positive torque condition (i.e. while power is being transmitted along the vehicle powertrain via the transmission 10) will now be described in more detail. While the transmission is in the fifth selectable gear ratio configuration (FIG. 7) the third dog hub 36a on the input shaft 12 (acting as a reverse driving dog hub) is moved from engagement with the second gear 20a into engagement with the third gear 22a. When it engages and synchronises with the third gear 22a the third dog hub 36a acts as a forward driving dog hub and so drivingly rotates the third gear 22a. Moreover the difference in gear ratio between: i) the interface between the third gear 22a on the input shaft 12 and the second (larger diameter) portion $22b_2$ of the quaternary gear 22b on the bridging shaft 14; and ii) the interface between the second gear 20a on the input shaft 12 and the tertiary gear $20b_2$ on the bridging shaft 14, is such that when torque is being transferred along the fifth load path L5 the third gear 22a on the input shaft 12 will be rotating slower than the second gear 20a—and so the third gear 22a will be rotating slower than the input shaft 12 itself. Thus, when the third dog hub 36a is urged against the third gear 22a it catches up (synchronises) with and begins to act as the forward driving dog hub for that gear and so becomes loaded by drivingly rotating the third gear 22a. Following this the third gear 22a will rotate at the same speed as the input shaft 12, thus enabling the fourth dog hub 38a to fall into interlocking engagement therewith as in FIG. 14 with minimal backlash.

Due to the meshing engagement with the third gear 22a on the input shaft 12, the second (larger diameter) portion $22b_2$ of the quaternary gear 22b on the bridging shaft 14 is drivingly rotated. The fourth dog hub 38b on the bridging shaft 14 acting as a forward driving dog hub will thus become drivingly engaged by the quaternary gear 22b as it rotates, after which the bridging shaft 14 will be caused to rotate at the same speed as the quaternary gear 22b. This enables the third dog hub 36b, acting as a reverse driving dog hub, to fall into interlocking engagement with the other side of the quaternary gear 22b as in FIG. 14.

The third gear 22a on the input shaft 12 has a bigger diameter than the second gear 20a. Moreover the difference in gear ratio between: i) the interface between the third gear 22a on the input shaft 12 and the second (larger diameter) portion $22b_2$ of the quaternary gear 22b on the bridging shaft 14; and ii) the interface between the second gear 20a on the input shaft 12 and the tertiary gear $20b_2$ on the bridging shaft 14, is such that for a given rotational speed of the input shaft 12 the bridging shaft 14 will be caused to rotate faster when the third gear 22a is rotationally fixed to the input shaft 12 compared to when only the second gear 20a is rotationally fixed thereto.

When the third dog hub 36a on the input shaft 12 begins to act as the forward driving dog hub of the third gear 22a, and the fourth dog hub 38b on the bridging shaft 14 begins acting as the forward driving dog hub of the quaternary gear 22b, torque begins flowing along the load path L6 (see FIG. 8) between the torque input feature 13 and the torque output feature 15. Since the second dog hub 34a is not loaded when torque flows along load path L6 it can be moved out of engagement with the second gear 20a.

In more detail, when the sixth selectable gear ratio configuration (FIG. 8) has been engaged positive torque is transferred through the transmission 10 as follows. The torque input feature 13 is rotatably driven in a forward rotational direction (e.g. by an engine or motor)>the input shaft 12 operatively connected to the torque input feature 13 thus rotates at the same speed>this causes rotation of the third and fourth dog hubs 36a, 38a rotationally fixed thereto>the third dog hub 36a acting as a forward driving dog hub drivingly rotates the third gear 22a>torque is transferred to the second (larger diameter) portion 22b₂ of the quaternary gear 22b on the bridging shaft 14 via the meshing engagement therewith>the fourth dog hub 38b acting as the forward driving dog hub is rotatably driven by the quaternary gear 22b>this causes the bridging shaft 14 to rotate due to being rotationally fixed relative to the fourth dog hub 38b>the secondary gear rotationally fixed to the bridging shaft 14 thus rotates>torque is then transferred to the second gear 20c on the output shaft 16 via the meshing engagement therewith>the third dog hub 36c acting as a forward driving dog hub is rotatably driven by the second gear 20c>this causes the output shaft 16 to rotate due to being rotationally fixed relative to the third dog hub 36c>which causes the torque output feature 15 to rotate at the same speed due to being operatively connected to the output shaft 16>whereby the torque output feature 15 rotatably drives components downstream in the vehicle powertrain.

In the just described positive torque condition the fourth dog hub 38a on the input shaft 12; the third dog hub 36b on the bridging shaft 14; and the second dog hub 34c on the output shaft 16 all act as reverse driving dog hubs; meaning that they are not loaded. However, in a reverse torque condition torque is transferred in the reverse direction along the load path L6, in which case the reverse driving dog hubs become loaded and the forward driving dog hubs are no longer loaded.

A shift from the fifth to sixth selectable gear ratio configuration gives rise to another step variation in resultant gear ratio between the torque input and output features 13, 15. In some embodiments such a shift from the fifth to sixth selectable gear ratio configuration could also give rise to a variation of 1.23:1 in resultant gear ratio between the torque input and output features 13, 15.

An increase in rotational speed of the bridging shaft 14 following a shift into the sixth selectable gear ratio configuration (FIG. 8) results in a corresponding increase in rotational speed of the output shaft 16—and thus the torque output feature 15. As a result, for a given engine or motor speed the vehicle can be caused to travel at a greater speed than when the transmission was in the fifth or any other previous selectable gear ratio configuration.

Sixth to Seventh

Figure 9:
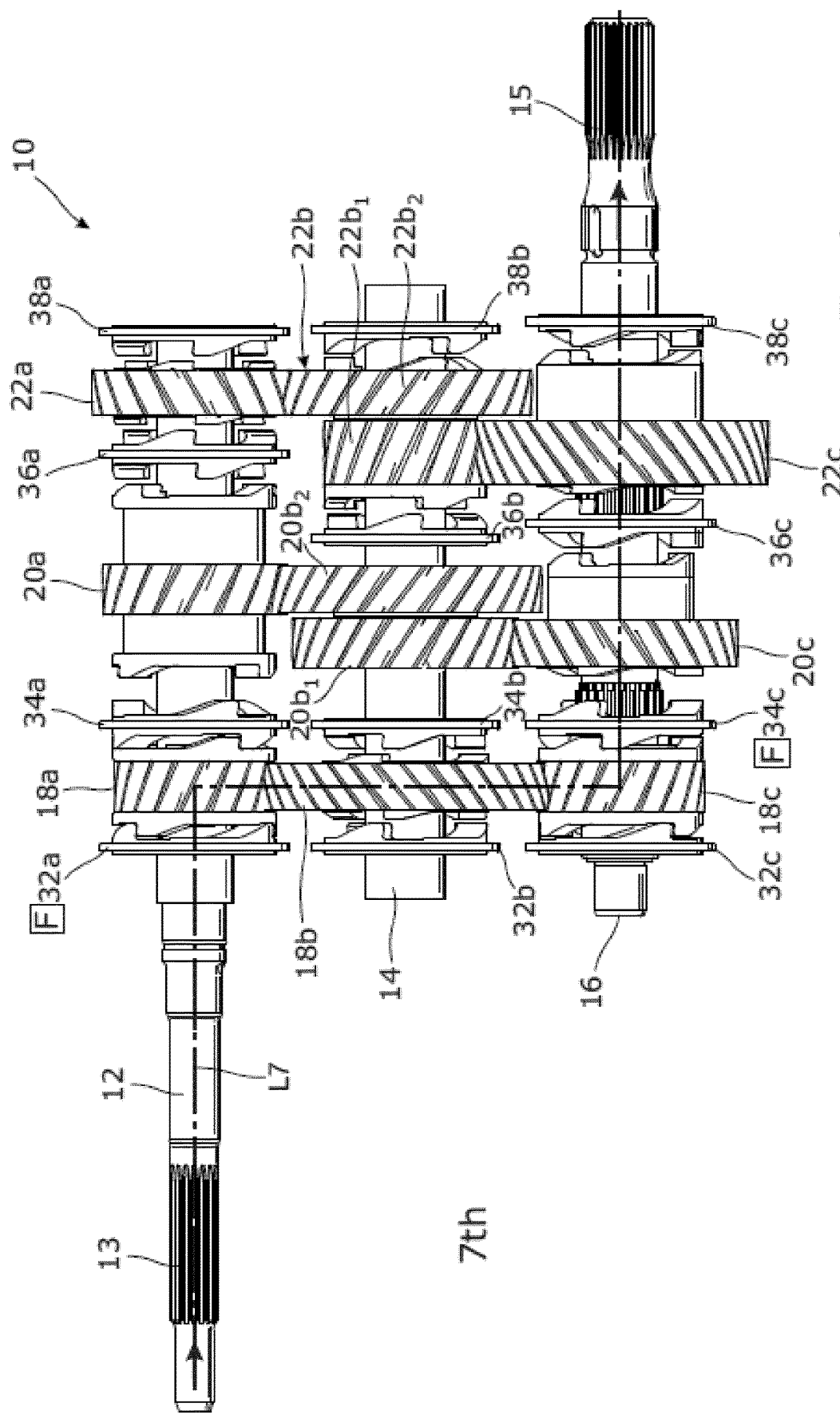

A change in the overall combination of gears rotationally fixed to respective shafts is required in order to progress to the seventh selectable gear ratio configuration of the transmission 10 (FIG. 9). Moreover to progress from the sixth to the seventh selectable gear ratio configuration: the third and fourth dog hubs 36a, 38a on the input shaft 12 are to be separated from engagement with the third gear 20a; the third and fourth hubs 36b, 38b on the bridging shaft 14 are be separated from engagement with the quaternary gear 38b; the second and third dog hubs 34c, 36c on the output shaft 16 are be separated from engagement with the second gear 34c; the first and second dog hubs 32a, 34a on the input shaft 12 are to be engaged with the first gear 18a; and the first and second dog hubs 32c, 34c on the output shaft 16 are to be engaged with the first gear 18c. Subsequently torque is transferred along the load path L7 between the torque input and output features 13, 15 when the input shaft 12 is rotatably driven in a forward rotational direction. In a reverse torque condition torque is transferred in the reverse direction along load path L7 between the torque output and input features 15, 13.

Variations in dog hub positions required to change from the sixth selectable gear ratio configuration (FIG. 8) to the seventh selectable gear ratio configuration (FIG. 9) while the transmission is in a positive torque condition (i.e. while power is being transmitted along the vehicle powertrain via the transmission 10) will now be described in more detail. While the transmission is in the sixth selectable gear ratio configuration (FIG. 8) the fourth dog hub 38a on the input shaft 12 (acting as a reverse driving dog hub) is moved from engagement with the third gear 22a, which is enabled due to the fourth dog hub 38a being a reverse driving dog hub and so not loaded in a positive torque condition of the transmission 10. Subsequently the first and second dog hubs 32a, 34a on the input shaft 12 are moved into engagement with the first gear 18a; and the first and second dog hubs 32c, 34c on the output shaft 16 are moved into engagement with the first gear 18c; whereby the second dog hub 34c on the output shaft 16 can be separated from the second gear 20c while positive torque is being transferred along the load path L6 due to its also being a reverse driving dog hub. Torque will thus begin flowing along load path L7 instead of L6. Subsequently each of the third dog hub 36a on the input shaft 12, the third and fourth dog hubs 36b, 38b on the bridging shaft 14 and the third dog hub 36c on the output shaft 16 will no longer be loaded due to torque flowing along load path L7 and so can be removed from engagement with the third gear 22a on the input shaft 12, the quaternary gear 22b on the bridging shaft 14 and the second gear 20c on the output shaft 16.

More specifically during an upshift from the sixth selectable gear ratio configuration (FIG. 8) to the seventh selectable gear ratio configuration (FIG. 9), only after each of the forward driving dog hubs of the seventh selectable gear ratio configuration (in other words, both of such forward driving dog hubs) have synchronised with the gears into which they are respectively moved into contact with will torque start flowing along load path L7 instead on L6. Such forward driving dog hubs being: the first dog hub 32a on the input shaft 12 and the second dog hub 34c on the output shaft 16. Now with regards to the reverse driving dog hubs of the seventh selectable gear ratio configuration (FIG. 9), when a forward driving dog hub thereof synchronises with its respective gear as described then the corresponding reverse driving dog hub will fall into interlocking engagement with that gear as well with minimal backlash. In this manner the reverse driving dog hubs of the seventh selectable gear ratio configuration are engaged, such dog hubs being: the second dog hub 34a on the input shaft 12 and the first dog hub 32c on the output shaft 16.

To avoid a lockup condition of the transmission 10 while upshifting from the sixth to seventh selectable gear ratio configuration, the reverse driving dog hub of the third gear 22a on the input shaft 12 (i.e. the fourth dog hub 38a) must or should be disengaged from contact with the third gear 22a before the forward driving dog hub of the first gear 18a on the input shaft 12 (i.e. the first dog hub 32a) is engaged with the first gear 18a. Ways of achieving this have already been discussed in connection with upshifting between the third and fourth selectable gear ratio configurations.

It does not matter in which order the forward driving dog hubs of the seventh selectable gear ratio configuration move into contact and synchronise with the first gear 18a on the input shaft 12 and the first gear 18c on the output shaft 16 respectively. However as mentioned previously, only after both forward driving dog hubs have synchronised with the gear into which they are moved into contact with will torque start flowing along load path L7. The order of synchronisation is likely to differ depending on the specific configuration of the transmission 10 and factors affecting this have already been discussed in connection with upshifting between the third and fourth selectable gear ratio configurations.

More specific details of an exemplary upshift operation between the sixth and seventh selectable gear ratio configurations are now provided.

Since the first gear 18a on the input shaft 12 is free to rotate relative to the input shaft 12 while the transmission is in the sixth gear ratio configuration (FIG. 8), upon shifting to the seventh gear ratio configuration (FIG. 9) the input shaft 12—and thus the first dog hub 32a rotationally fixed to it—will be rotating faster than the first gear 18a. Therefore, in a positive torque condition of the transmission 10, as the first dog hub 18a is urged against the first gear 32a it will catch up (synchronise) with that gear and so become loaded and begin drivingly rotating the first gear 18a; in other words, it will act as a forward driving dog hub.

After this the first gear 18a will rotate at the same speed as the input shaft 12, thus enabling the second dog hub 34a to fall into interlocking engagement therewith as in FIG. 14 with minimal backlash. Due to the meshing engagement with the first gear 18a on the input shaft 12, the primary gear 18b on the bridging shaft 14 is drivingly rotated. The primary gear 18b is free to rotate relative to the bridging shaft 14 and so torque is transferred via the primary gear 18b to the first gear 18c on the output shaft 16.

The primary gear 18b on the bridging shaft 14 has a bigger diameter than the secondary gear $20b_1$ on the bridging shaft 14. Moreover the difference in gear ratio between: i) the interface between the primary gear 18b on the bridging shaft 14 and the first gear 18c on the output shaft 16; and ii) the interface between the secondary gear $20b_1$ on the bridging shaft 14 and the second gear 20c on the output shaft 16, is such that for a given rotational speed of the input shaft 12 the first gear 18c on the output shaft 16 is driven faster in the seventh selectable gear ratio configuration (FIG. 9) compared to the rotational speed at which the second gear 20c on the output shaft 16 is driven in the sixth selectable gear ratio configuration (FIG. 8). As such, upon selecting the seventh selectable gear ratio configuration (FIG. 9) the first gear 18c will be caused to catch up (synchronise) with and drivingly rotate the second dog hub 34c which will thus become loaded and act as a forward driving dog hub, whereby torque will subsequently flow along the load path L7 (see FIG. 9) between the torque input feature 13 and the torque output feature 15.

After this the first gear 18c on the output shaft 16 will rotate at the same speed as the output shaft 16, thus enabling the first dog hub 32c on the output shaft 16 to fall into interlocking engagement therewith as in FIG. 14 with minimal backlash. Since each of: the third dog hub 36a on the input shaft 12; the third dog hub 38b on the bridging shaft 14; and the fourth dog hub 38b on the bridging shaft 14 will subsequently no longer be loaded when torque flows along the load path L7, they are able to be removed from engagement with the third gear 22a on the input shaft 12 and the quaternary gear 22b on the bridging shaft 14. Furthermore, when torque starts flowing along load path L7 the output shaft 16 will start rotating faster than the second gear 34c so the third dog hub 36c is pushed out of engagement therewith due to the heretofore described ramped portions of these components being caused to ride over each other.

When the seventh selectable gear ratio configuration (FIG. 9) has been engaged positive torque is transferred through the transmission 10 as follows. The torque input feature 13 is rotatably driven in a forward rotational direction (e.g. by an engine or motor)>the input shaft 12 operatively connected to the torque input feature 13 thus rotates at the same speed>this causes rotation of the first and second dog hubs 32a, 34a rotationally fixed thereto>the first dog hub 32a acting as a forward driving dog hub drivingly rotates the first gear 18a>torque is transferred to the primary gear 18b on the bridging shaft 14 via the meshing engagement therewith>torque is then transferred to the first gear 18c on the output shaft 16 via the meshing engagement therewith>the second dog hub 34c acting as the forward driving dog hub is rotatably driven by the first gear 18c>this causes the output shaft 16 to rotate due to being rotationally fixed relative to the second dog hub 34c>which causes the torque output feature 15 to rotate at the same speed due to being operatively connected to the output shaft 16>whereby the torque output feature 15 rotatably drives components downstream in the vehicle power train.

In the just described positive torque condition the second dog hub 34a on the input shaft 12 and the first dog hub 32c on the output shaft 16 act as reverse driving dog hubs; meaning that they are not loaded. However, in a reverse torque condition torque is transferred in the reverse direction along the load path L7, in which case the reverse driving dog hubs become loaded and the forward driving dog hubs are no longer loaded.

It will be noted that a shift from the sixth to seventh selectable gear ratio configuration involves a block shift along the input shaft 12 and a single shift along the output shaft 16. The difference in gear ratio between: i) the interface between the primary gear 18b on the bridging shaft 14 and the first gear 18c on the output shaft 16; and ii) the interface between the secondary gear $20b_1$ on the bridging shaft 14 and the second gear 20c on the output shaft 16, is equivalent to three step changes in resultant gear ratio (i.e. three times the step in resultant gear ratio caused by shifting from the first to second, second to third, third to fourth etc. heretofore described gear ratio configurations). However this coupled with the difference in gear ratio between: i) the interface between the third gear 22a on the input shaft 12 and the second (larger diameter) portion $22b_2$ of the quaternary gear 22b on the bridging shaft 14; and ii) the interface between the first gear 18a on the input shaft 12 and the primary gear 18b on the bridging shaft 14, provides that upon shifting from the sixth to seventh gear ratio configuration of the transmission 10 the change in resultant gear ratio experienced between the torque input and output features 13, 15 is equivalent to a single step change in gear ratio configuration (i.e. equivalent to the step change caused by shifting from $1^{st}$ to $2^{nd}$, $2^{nd}$ to $3^{rd}$, $3^{rd}$ to $4^{th}$ etc. as heretofore described).

Moreover, in some embodiments a shift from the sixth to seventh selectable gear ratio configuration could give rise to a variation of 1.23:1 in resultant gear ratio between the torque input and output features 13, 15.

Due to the increase in rotational speed of the output shaft 16 following a shift into the seventh selectable gear ratio configuration (FIG. 9), for a given engine or motor speed the vehicle can be caused to travel at a greater speed than when the transmission was in the sixth or any other previous selectable gear ratio configuration.

Seventh to Eighth

Figure 10:
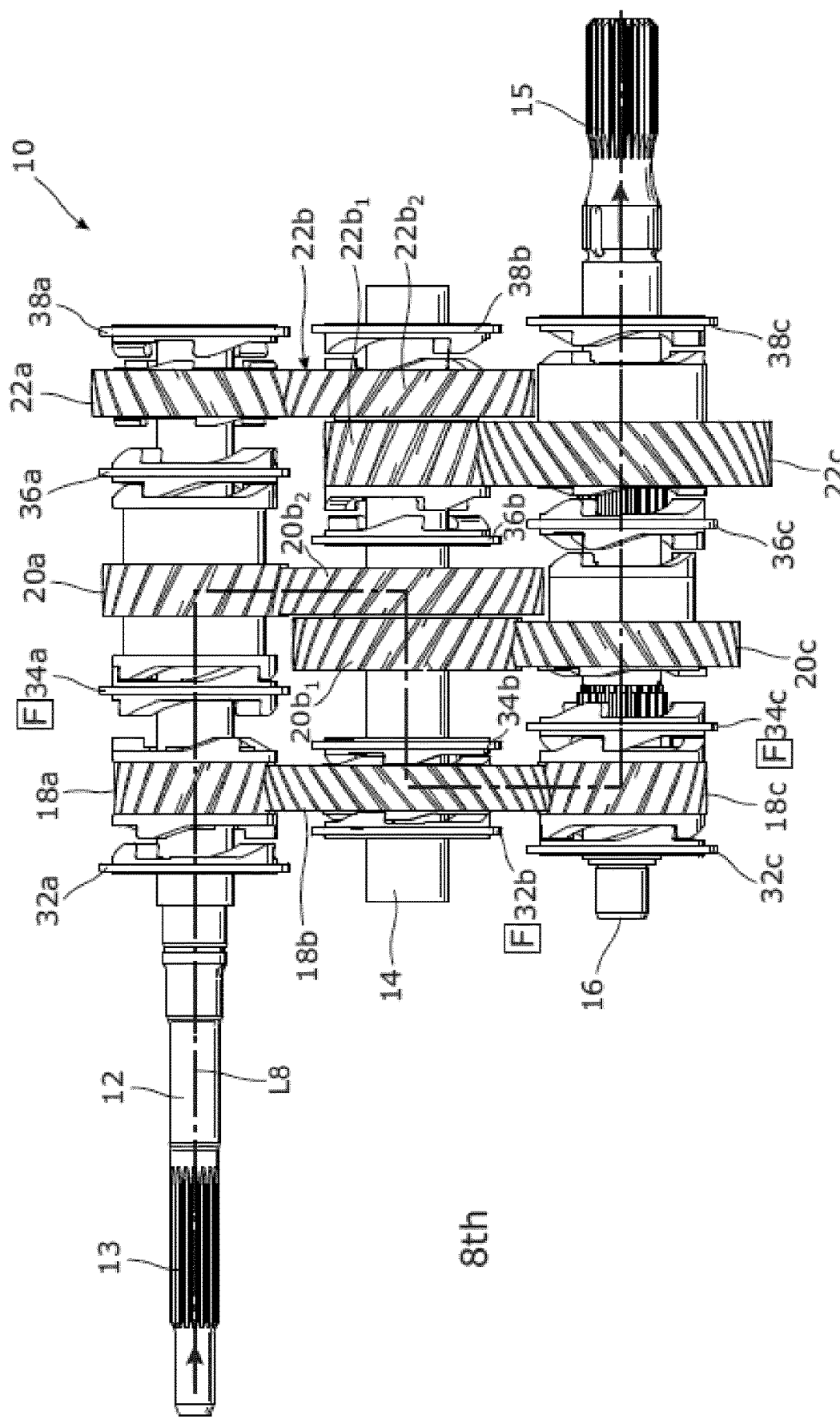

A change in the overall combination of gears rotationally fixed to the respective shafts is required in order to progress to the eighth selectable gear ratio configuration of the transmission 10 (FIG. 10). Moreover to progress from the seventh to the eighth selectable gear ratio configuration: the first and second dog hubs 32a, 34a on the input shaft 12 are to be separated from engagement with the first gear 18a, whereas the second and third dog hubs 34a, 36a on the input shaft 12 are to be moved into engagement with the second gear 20a; and the first and second dog hubs 32b, 34b on the bridging shaft 14 are to be engaged with the primary gear 18b. However, the first and second dog hubs 32c, 34c on the output shaft 16 are to remain in engagement with the first gear 18c. Subsequently torque is transferred along the load path L8 between the torque input and output features 13, 15 when the input shaft 12 is rotatably driven in a forwardrotational direction. In a reverse torque condition torque is transferred in the reverse direction along load path L8 between the torque output and input features 15, 13.

Variations in dog hub positions required to change from the seventh selectable gear ratio configuration (FIG. 9) to the eighth selectable gear ratio configuration (FIG. 10) while the transmission is in a positive torque condition (i.e. while power is being transmitted along the vehicle powertrain via the transmission 10) will now be described in more detail. While the transmission is in the seventh selectable gear ratio configuration (FIG. 9) the second dog hub 34a on the input shaft 12 (acting as a reverse driving dog hub) is moved from engagement with the first gear 18a into engagement with the second gear 20a. When it engages and synchronises with the second gear 20a the second dog hub 34a acts as a forward driving dog hub and so drivingly rotates the second gear 20a. Moreover the difference in gear ratio between: i) the interface between the second gear 20a on the input shaft 12 and the tertiary gear $20b_2$ on the bridging shaft 14; and ii) the interface between the first gear 18a on the input shaft 12 and the primary gear 18b on the bridging shaft 14, is such that when torque is being transferred along the seventh load path L7 the second gear 20a on the input shaft 12 Will be rotating slower than the first gear 18a—and so the second gear 20a will be rotating slower than the input shaft 12 itself. Thus, when the second dog hub 34a is urged against the second gear 20a it catches up (synchronises) with and begins to act as the forward driving dog hub for that gear and so becomes loaded by drivingly rotating the second gear 20a.

Following this the second gear 20a will rotate at the same speed as the input shaft 12, thus enabling the third driving dog hub 36a to fall into interlocking engagement therewith as in FIG. 14 with minimal backlash. The second gear 20a on the input shaft 12 has a bigger diameter than the first gear 18. Moreover the difference in gear ratio between: i) the interface between the second gear 20a on the input shaft 12 and the tertiary gear $20b_2$ on the bridging shaft 14; and ii) the interface between the first gear 18a on the input shaft 12 and the primary gear 18b on the bridging shaft 14, is such that for a given rotational speed of the input shaft 12 the bridging shaft 14 will be caused to rotate faster when the second gear 20a is rotationally fixed to the input shaft 12 compared to when only the first gear 18a is rotationally fixed thereto.

While the second and third dog hubs 34a, 36a on the input shaft are moved into engagement with the second gear 20a as described above, the first and second dog hubs 32b, 34b on the bridging shaft 14 are moved into engagement with the primary gear 18b.

Thus, when the second dog hub 34a begins to act as the forward driving dog hub of the second gear 20a, torque begins flowing along the load path L8 (see FIG. 10) between the torque input feature 13 and the torque output feature 15. Since the first dog hub 32a on the input shaft 12 is not loaded when torque flows along load path L8 it is able to be moved out of engagement with the first gear 18a.

In more detail, when the eighth selectable gear ratio configuration (FIG. 10) has been engaged, positive torque is transferred through the transmission 10 as follows. The torque input feature 13 is rotatably driven in a forward rotational direction (e.g. by an engine or motor)>the input shaft 12 operatively connected to the torque input feature 13 thus rotates at the same speed>this causes rotation of the second and third dog hubs 34a, 36a rotationally fixed thereto>the second dog hub 34a acting as a forward driving dog hub drivingly rotates the second gear 20a>torque is transferred to the tertiary gear $20b_2$ on the bridging shaft 14 via the meshing engagement therewith>this causes the bridging shaft 14 to rotate due to being rotationally fixed relative to the tertiary gear $20b_2$>the first dog hub 32b thus rotates with the bridging shaft 14 due to being rotationally fixed thereto>the first dog hub 32b acting as a forward driving dog hub rotatably drives the primary gear 18b>torque is transferred to the first gear 18c on the output shaft 16 via the meshing engagement therewith>the second dog hub 34c acting as a forward driving dog hub is rotatably driven by the first gear 18c>this causes the output shaft 16 to rotate due to being rotationally fixed relative to the second dog hub 34c>which causes the torque output feature 15 to rotate at the same speed due to being operatively connected to the output shaft 16>whereby the torque output feature 15 rotatably drives components downstream in the vehicle power train.

In the just described positive torque condition the third dog hub 36a on the input shaft 12, the second dog hub 34b on the bridging shaft 14 and the first dog hub 32c on the output shaft 16 all act as reverse driving dog hubs; meaning that they are not loaded. However, in a reverse torque condition torque is transferred in the reverse direction along the load path L8, in which case the reverse driving dog hubs become loaded and the forward driving dog hubs are no longer loaded.

A shift from the seventh to eighth selectable gear ratio configuration gives rise to a step variation in resultant gear ratio between the torque input and output features 13, 15. In some embodiments such a shift from the seventh to eighth selectable gear ratio configuration could give rise to a variation of 1.23:1 in resultant gear ratio between the torque input and output features 13, 15.

An increase in rotational speed of the bridging shaft 14 following a shift into the eighth selectable gear ratio configuration (FIG. 10) results in a corresponding increase in rotational speed of the output shaft 16—and thus the torque output feature 15. As a result, for a given engine or motor speed the vehicle can be caused to travel at a greater speed than when the transmission 10 was in the seventh or any other previous selectable gear ratio configuration.

Eighth to Ninth

Figure 11:
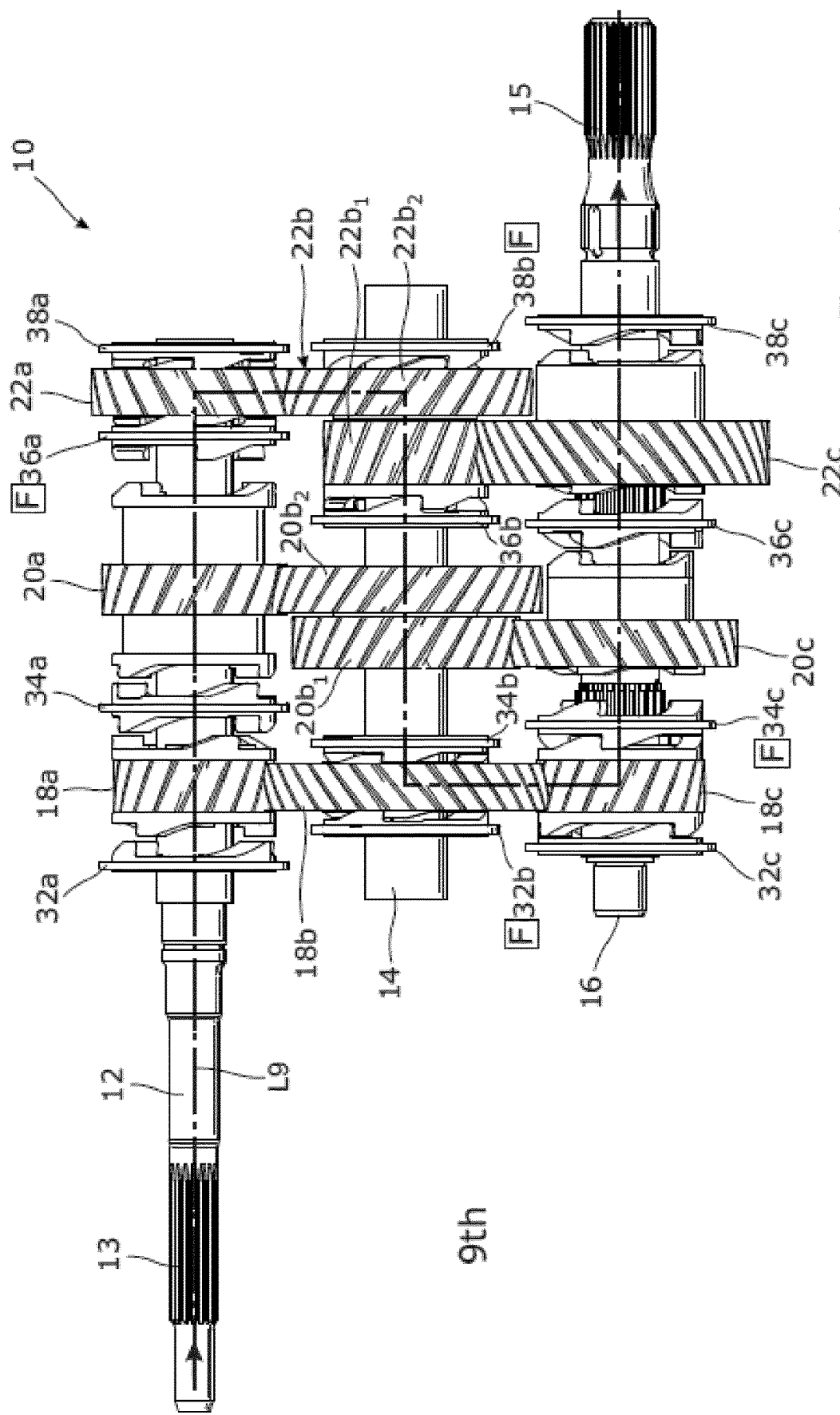

A change in the overall combination of gears rotationally fixed to respective shafts is required in order to progress to the ninth selectable gear ratio configuration of the transmission 10 (FIG. 11). Moreover to progress from the eighth to the ninth selectable gear ratio configuration: the second and third dog hubs 34a, 36a on the input shaft 12 are to be separated from engagement with the second gear 20a, whereas the third and fourth hubs 36a, 38a on the input shaft 12 to be moved into engagement with the third gear 22a; and the third and fourth dog hubs 36b, 38b on the bridging shaft 14 are to be moved into engagement with the quaternary gear 22b. However, the first and second dog hubs 32b, 34b on the bridging shaft 14 are to remain in engagement with the primary gear 18b and the first and second dog hubs 32c, 34c on the output shaft 16 are to remain in engagement with the first gear 18c. Subsequently torque is transferred along the load path L9 between the torque input and output features 13, 15 when the input shaft 12 is rotatably driven in a forwardrotational direction. In a reverse torque condition torque is transferred in the reverse direction along load path L9 between the torque output and input features 15, 13.

Variations in dog hub positions required to change from the eighth selectable gear ratio configuration (FIG. 10) to the ninth selectable gear ratio configuration (FIG. 11) while the transmission is in a positive torque condition (i.e. while power is being transmitted along the vehicle powertrain via the transmission 10) will now be described in more detail. While the transmission is in the eighth selectable gear ratio configuration (FIG. 10) the third dog hub 36a on the input shaft 12 (acting as a reverse driving dog hub) is moved from engagement with the second gear 20a into engagement with the third gear 22a. When it engages and synchronises with the third gear 22a the third dog hub 36a acts as a forward driving dog hub and so drivingly rotates the third gear 22a. Moreover the difference in gear ratio between: i) the interface between the third gear 22a on the input shaft 12 and the second (larger diameter) portion $22b_2$ of the quaternary gear 22b on the bridging shaft 14; and ii) the interface between the second gear 20a on the input shaft 12 and the tertiary gear $20b_2$ on the bridging shaft 14, is such that when torque is being transferred along the load path L8 the third gear 22a on the input shaft 12 will be rotating slower than the second gear 20a—and so the third gear 22a will be rotating slower than the input shaft 12 itself. Thus, when the third dog hub 36a is urged against the third gear 22a it catches up (synchronises) with and begins to act as the forward driving dog hub for that gear and so becomes loaded by drivingly rotating the third gear 22a.

Following this the third gear 22a will rotate at the same speed as the input shaft 12, thus enabling the fourth dog hub 38a to fall into interlocking engagement therewith as in FIG. 14 with minimal backlash. The third gear 22a on the input shaft 12 has a bigger diameter than the second gear 20a. Moreover the difference in gear ratio between: i) the interface between the third gear 22a on the input shaft 12 and the second (larger diameter) portion $22b_2$ of the quaternary gear 22b on the bridging shaft 14; and ii) the interface between the second gear 20a on the input shaft 12 and the tertiary gear $20b_2$ on the bridging shaft 14, is such that for a given rotational speed of the input shaft 12 the bridging shaft 14 will be caused to rotate faster when the third gear 22a is rotationally fixed to the input shaft 12 compared to when only the second gear 20a is rotationally fixed thereto.

While the third and fourth dog hubs 36a, 38a on the input shaft 12 are moved into engagement with the third gear 22a as described above, the third and fourth dog hubs 36b, 38b on the bridging shaft 14 are moved into engagement with the quaternary gear 22b.

Thus, when the third dog hub 36a on the input shaft 12 begins to act as the forward driving dog hub of the third gear 22a, torque begins flowing along the load path L9 (see FIG. 11) between the torque input feature 13 and the torque output feature 15. Since the second dog hub 34a on the input shaft 12 is not loaded when torque begins flowing along load path L9 it can be moved out of engagement with the second gear 20a.

In more detail, when the ninth selectable gear ratio configuration (FIG. 11) has been engaged positive torque is transferred through the transmission 10 as follows. The torque input feature 13 is rotatably driven in a forward rotational direction (e.g. by an engine or motor)>the input shaft 12 operatively connected to the torque input feature 13 thus rotates at the same speed>this causes rotation of the third and fourth dog hubs 36a, 38a rotationally fixed thereto>the third dog hub 36a acting as a forward driving dog hub drivingly rotates the third gear 22a>torque is transferred to the second (larger diameter) portion $22b_2$ of the quaternary gear 22b on the bridging shaft 14 via the meshing engagement therewith>the fourth dog hub 38b acting as the forward driving dog hub is rotatably driven by the quaternary gear 22b>this causes the bridging shaft 14 to rotate due to being rotationally fixed relative to the fourth dog hub 38b>the first dog hub 32b thus rotates with the bridging shaft 14 due to being rotationally fixed thereto>the first dog hub 32b acting as a forward driving dog hub rotatably drives the primary gear 18b>torque is then transferred to the first gear 18c on the output shaft 16 via the meshing engagement therewith>the second dog hub 34c acting as a forward driving dog hub is rotatably driven by the first gear 18c>this causes the output shaft 16 to rotate due to being rotationally fixed relative to the second dog hub 34c>which causes the torque output feature 15 to rotate at the same speed due to being operatively connected to the output shaft 16>whereby the torque output feature 15 rotatably drives components downstream in the vehicle powertrain.

In the just described positive torque condition the fourth dog hub 38a on the input shaft 12, the second and third dog hubs 34b, 36b on the bridging shaft 14 and the first dog hub 32c on the output shaft 16 act as reverse driving dog hubs; meaning that they are not loaded. However, in a reverse torque condition torque is transferred in the reverse direction along the load path L9, in which case the reverse driving dog hubs become loaded and the forward driving dog hubs are no longer loaded.

A shift from the eighth to ninth selectable gear ratio configuration gives rise to another step variation in resultant gear ratio between the torque input and output features 13, 15. In some embodiments such a shift from the eighth to ninth selectable gear ratio configuration could also give rise to a variation of 1.23:1 in resultant gear ratio between the torque input and output features 13, 15.

An increase in rotational speed of the bridging shaft 14 following a shift into the ninth selectable gear ratio configuration (FIG. 11) results in a corresponding increase in rotational speed of the output shaft 16—and thus the torque output feature 15. As a result, for a given engine or motor speed the vehicle can be caused to travel at a greater speed than when the transmission was in the eighth or any other previous selectable gear ratio configuration.

Additional Information

Since upshifts in gear ratio can occur while the transmission 10 is in a positive torque condition (i.e. while power is being transmitted along the vehicle powertrain via the transmission 10), this means that upshifts can occur without loss of vehicular driving power. An advantage of this is that faster vehicular acceleration can take place, compared to vehicles that require a clutch to be engaged/disengaged to implement upshifts.

Down shifts are completed by the same mechanism of movement heretofore described but in reverse and while negative torque is being transmitted (i.e. when torque is being transferred through the transmission 10 from the torque output feature 15 to the torque input feature 13, which can occur when a driver lifts their foot off the vehicle throttle for example.

Figure 15:
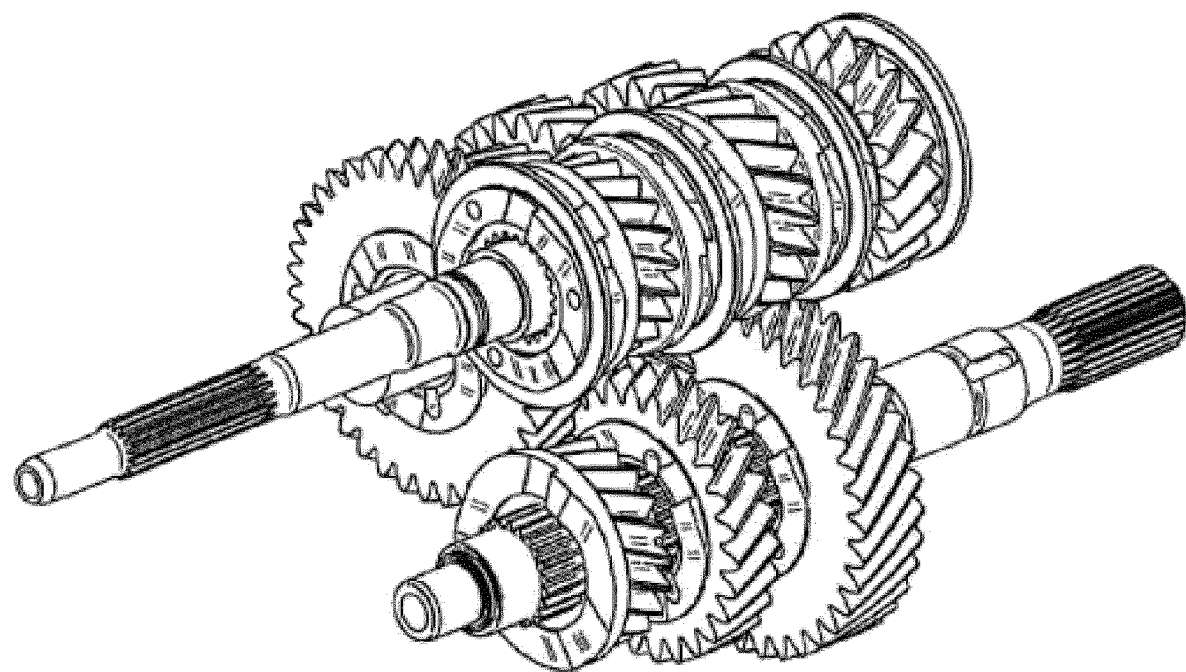
FIG. 15 is a schematic plan view of a transmission according to another embodiment.

In the heretofore described transmission 10 the input shaft 12, bridging shaft 14 and output shaft 16 each extend along the same notional plane. In other words, a notional straight line perpendicular to the input shaft 12 will extend through the bridging shaft 14 and the output shaft 16 also. However, in some embodiments the input shaft 12, bridging shaft 14 and output shaft 16 may not extend along the same notional plane, in which case they could be arranged in a triangular orientation making the input shaft 12 closer to the output shaft 16 like in FIG. 15.

Details are here provided of one suitable mechanism for causing appropriate dog hub movements to occur for implementing gear ratio shifts in the heretofore described transmission 10. In this mechanism the dog hub movements required to implement gear ratio shifts are controlled by shift shafts similarly as described between page 12, line 17 to page 15, line 32 of WO2014/049317A1 already referred to. Moreover, each of the input shaft 12, bridging shaft 14 and output shaft 16 is associated with its own respective shift shaft for causing movements of the dog hubs thereon when the associated shift shaft is rotated. In such an arrangement the shift shaft for the input shaft 12 is indexed round by 30 degrees on each gear ratio shift. The shift shaft for the output shaft 16 is linked to the shift shaft for the input shaft 12 by an indexing mechanism which causes the shift shaft for the output shaft 16 to rotate 30 degrees on each third indexing of the shift shaft for the input shaft 12. The shift shaft for the bridging shaft 14 is also geared to the shift shaft for the input shaft 12 so as to rotate at three tenths the rate of that shaft. This provides that the shift shaft for the bridging shaft 14 has ten positions corresponding to neutral and the first to ninth selectable gear ratio configurations. Each of the three shift shafts mentioned here carries shift barrels with the desired groove patterns to cause the appropriate movements of dog hubs desired to implement shifts between neutral and the first to ninth selectable gear ratio configurations. Previously it was mentioned that in order to avoid a lockup condition of the transmission 10 a mechanical connection could be provided between the first and fourth dog hubs 32*a*, 38*a* on the input shaft 12 so that their respective movements are equal and opposite. In embodiments including such a mechanical connection, the shift shaft for the input shaft 12 has one less shifting barrel. For example, a shifting barrel may not be provided for controlling movements of the first dog hub 32*a*, whereas a shifting barrel may be provided for controlling movements of the fourth dog hub 38*a*. Nevertheless, the first dog hub 32*a* is caused to move with the fourth dog hub 38*a* due to the mechanical connection therebetween, so enabling respective gear ratio configurations to be selected whilst minimising the possibility of gearbox lockup. In other embodiments a shifting barrel may be provided for controlling movements of the first dog hub 32*a* but not the fourth dog hub 38*a*.

The number of selectable gear ratio configurations of the heretofore described transmission 10 could be increased by the inclusion of further gears along the input shaft 12 and meshing gears on the bridging shaft 14; the output shaft 16 however still having three gears. Any such additional gears included on the input shaft 12 (e.g. between the heretofore mentioned second and third gears 20*a*, 22*a*) would have a similar configuration thereto and would thus be rotationally couplable to the input shaft by dog hubs either side thereof. Whereas any additional gears included on the bridging shaft 14 (e.g. between the heretofore mentioned tertiary and quaternary gears 20*b*$_2$ and 22*b*) would mesh with a respective additional gear on the input shaft 12 and would also be rotationally fixed to the bridging shaft 14 like the heretofore mentioned secondary and tertiary gears 20*b*$_1$, 20*b*$_2$ fixed thereto. For example, six gears along the input shaft 12 would give a 6×3 transmission configuration having eighteen different selectable gear ratio configurations (whereby in the expression 6×3 the number 6 pertains to the number of gears on the input shaft 12 and the number 3 pertains to the number of gears on the output shaft 16). Simpler transmission configurations however are also possible for example a 4×2 configuration having four gears on the input shaft 12 and two on the output shaft 16. Furthermore, other transmission configurations for example 4×4 having sixteen selectable gear ratio configurations are also possible by using further dog hubs and gears on the bridging shaft 14.

Figure 16:
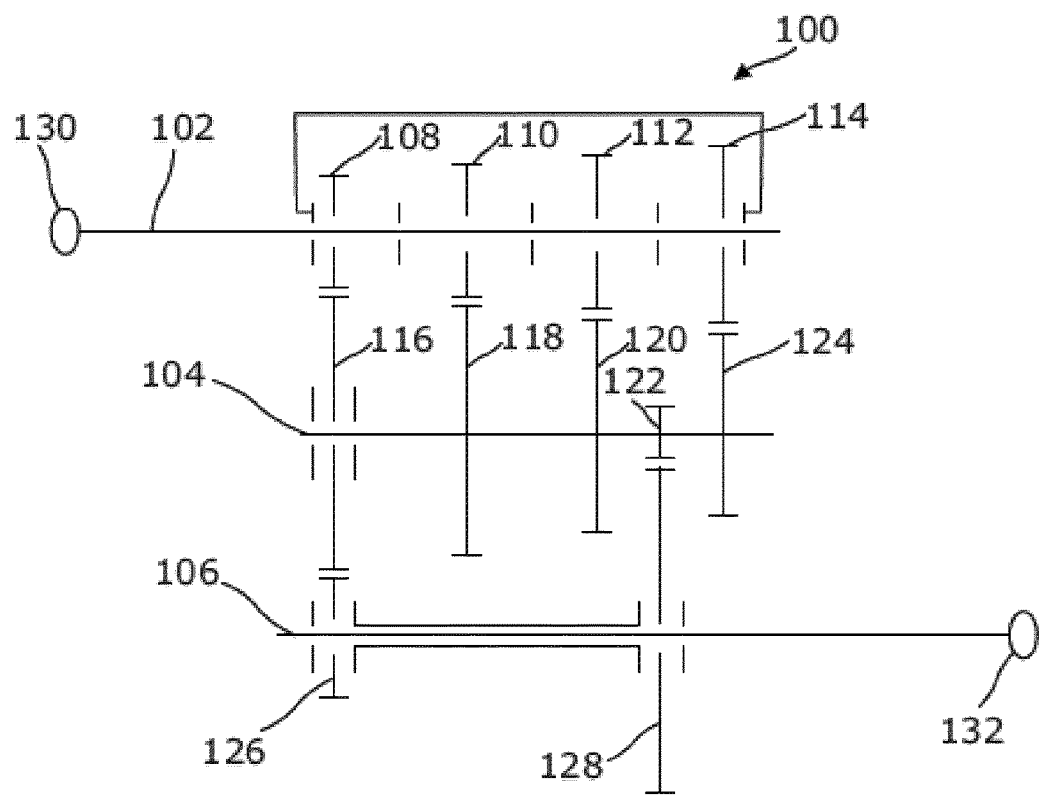
FIG. 16 is a schematic line drawing of a transmission according to a further embodiment.

FIG. 16 is a schematic line drawing of an example 4×2 version of the transmission. The transmission 100 has an input shaft 102, a bridging shaft 104 and an output shaft 106. The gears 108, 110, 112, 114 carried by the input shaft 102 can be rotationally fixed thereto by dog hubs in a similar manner to that heretofore described. The left and right most dog hubs on the input shaft (one being a forward driving dog hub and the other a reverse driving dog hub) are shown as being mechanically coupled so that they cannot be caused to engage the gears 108 and 114 simultaneously. The first gear 116 on the bridging shaft 104 can be rotationally fixed thereto by dog hubs in a similar manner to that heretofore described. The second, third, fourth and fifth gears 118, 120, 122, 124 are rotationally fixed to the bridging shaft 104. As for the output shaft 106, a first gear 126 carried thereby can be rotationally fixed thereto by dog hubs either side thereof. Furthermore, a second gear 128 carried by the output shaft 106 can be rotationally fixed thereto by dog hubs either side thereof. A forward driving dog hub and a reverse driving dog hub of the first/second gear pair 126, 128 are shown as being mechanically coupled so that they cannot be caused to engage the gears 126, 128 simultaneously. By changing the overall combination of gears of the transmission 100 rotationally fixed to the shafts 102, 104, 108 the load path, and so the resultant gear ratio, between a torque input 130 and a torque output 132 of the transmission (operatively coupled to the input and output shafts 102, 106 respectively) can be changed. Moreover, when only the first gear 126 of the output shaft 106 is rotationally coupled to the output shaft, respective resultant gear ratios from a first group thereof can be selected by changing the combination of gears rotationally fixed to the input and bridging shafts 102, 104. However, when only the second gear 128 of the output shaft 106 is rotationally coupled to the output shaft, respective resultant gear ratios from a second group thereof can be selected by changing the combination of gears rotationally fixed to the input and bridging shafts 102, 104.

Upon inspecting FIGS. 3 to 5, progressing through the first to third selectable gear ratios requires a change in the gears fixed to the input shaft 12 and the bridging shaft 14 to achieve the desired variations in load path in order to give rise to the different selectable gear ratios. However, no such change occurs in the gear fixed to the output shaft 16. This similarly occurs while progressing through the next three selectable gear ratios (i.e., the fourth to sixth gear ratios) and again while progressing through three selectable gear ratios after that (i.e. the seventh to ninth gear ratios). Shifts between: i) the third and fourth gear ratio configurations; and ii) the sixth and seventh gear ratio configurations can be referred to as range change shifts because they cause a change in the range of gear ratios that are selectable by movements of dog hubs on the input and bridging shafts 12, 14. As a result, the $1^{st}$ to $3^{rd}$ heretofore described selectable gear ratio configurations can be thought of as a first range of selectable gear ratios. Similarly, the 4th to 6th heretofore described selectable gear ratio configurations can be thought of as a second range of selectable gear ratios. Thus the $7^{th}$ to $9^{th}$ heretofore described selectable gear ratio configurations can be thought of as a third range of selectable gear ratios.

Although the shaft denoted 12 in the drawings has up now been described as an input shaft in operative connection with a torque input of the transmission 10, in other embodiments the transmission 10 could be connected the other way around inside a vehicle such that the shaft denoted 12 in the drawings is instead an output shaft in operative connection with a torque output of the transmission 10. The same correspondingly applies to the shaft denoted 16 in the drawings.

Up to now the respective gear connections between the bridging shaft 14 and the output shaft 16 have been described in the context of pairs of gears carried thereby being in mesh with one another. However, it is envisaged that in other transmission embodiments one or more such gear connections between the bridging shaft 14 and the output shaft 16 could include a planetary gearset. In other words, torque could be transferred between the bridging shaft 14 and the output shaft 16 in use via respective planetary gear set arrangements, depending on which was engaged at the time. Advantageously the ability of a planetary gearset to provide a larger ratio than is practical with a single pair of spur gears (for example a single planetary gear stage can readily provide a ratio from 3:1 up to 5:1) increases the range of resultant gear ratios achievable between the torque input feature 13 and output feature 15 in use, which is useful in heavy vehicles requiring high output torque such as tanks.

Figure 17:
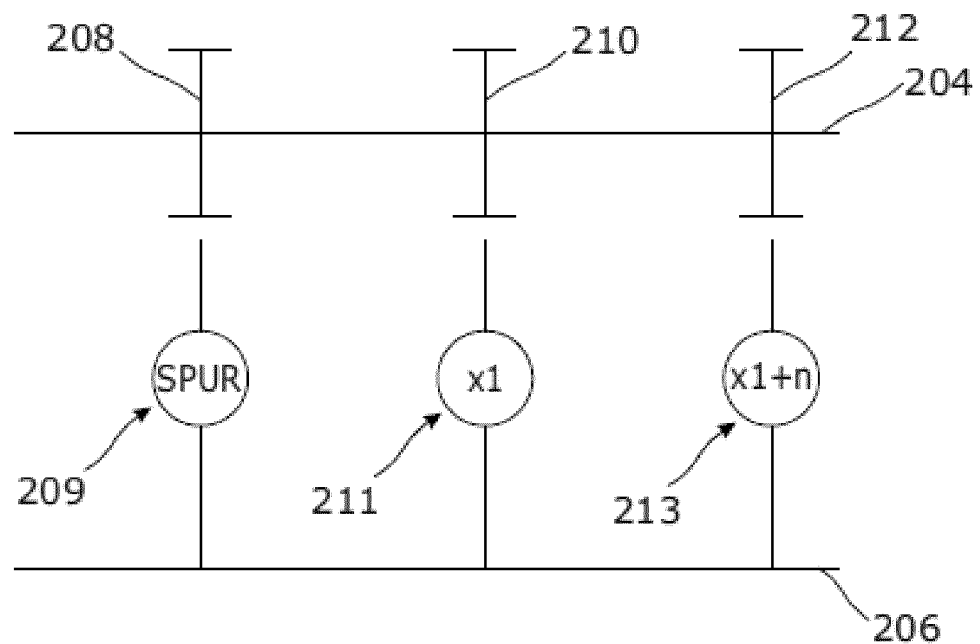

For example, FIG. 17 illustrates a bridging shaft 204 and an output shaft 206, whereby torque is able to be transferred there between via at least one planetary gear set in some instances. In particular a first spur gear 208 mounted on the bridging shaft 204 can transfer torque to the output shaft 206 via a 1.2:1 gear ratio connection, for example, by virtue of another spur gear 209 in mesh therewith when such gears are rotationally fixed to the shafts 204, 206 they are mounted on. A second spur gear 210 mounted on the bridging shaft 204 can transfer torque to the output shaft 206 via a different gear ratio connection (e.g. a 3:1 connection) by virtue of a planetary gear set 211 when such gear 210 and the output of the planetary gear set 211 are rotationally fixed to the shafts 204, 206 they are mounted on. A third spur gear 212 mounted on the bridging shaft 204 can transfer torque to the output shaft 206 via yet a different gear ratio connection (e.g. a 9:1 connection) by virtue of a planetary gear train 213 (which includes two or more planetary gear sets in series with one another) when such gear 212 and the output of the planetary gear train 213 are rotationally fixed to the shafts 204, 206 they are mounted on.

How the spread/range of selectable gear ratios can be increased in some embodiments should now be apparent. Nevertheless, it is here stated that in the example embodiment described with reference to FIGS. 2 to 11 the spread/range of selectable gear ratios is $(1.23)^8 = 5.24$. However, the provision of one or more planetary gear sets between the bridging shaft 14 and output shaft 16 as described with reference to FIG. 17 could increase the spread/range of selectable gear ratios, making the transmission even more suitable for vehicles with low power to weight ratio (e.g. heavy trucks and main battle tanks).

Figure 18:
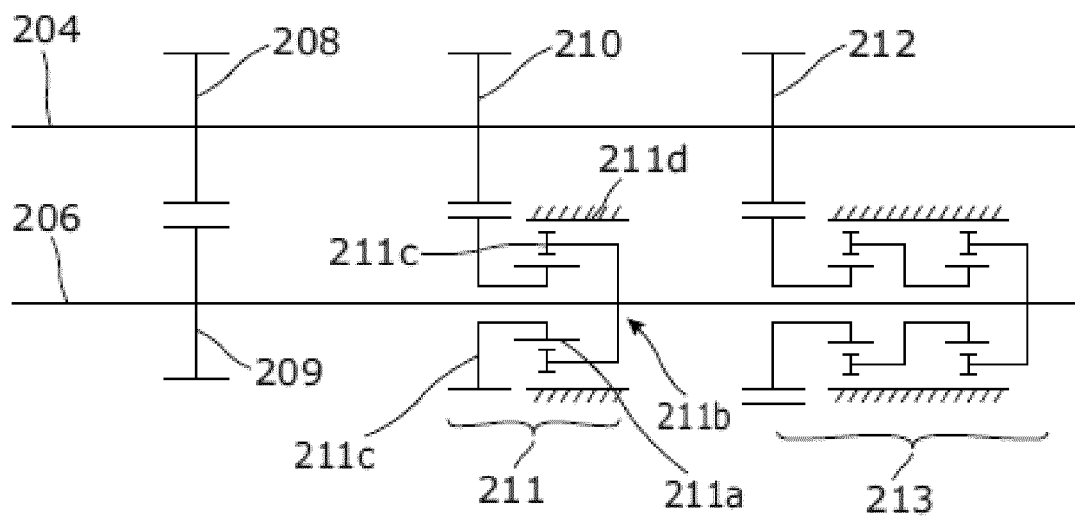

One way of achieving the foregoing is illustrated in FIG. 18, wherein components of an exemplary planetary gearset 211 and planetary gear train 213 are shown. In the embodiment illustrated the sun gear 211a is arranged to receive torque from the spur gear 210 and to transfer it to an output 211b via planet gears 211c and a ring gear 211d that is restricted from rotating. The planetary gear train 213 includes two similarly configured planetary gear sets in series with one another.

It will be appreciated that dog hubs provided on the output shat 206 and located on either side of the output 211b to the planetary gearset 111 can be used to rotationally couple it to the output shaft 206 in a similar manner to that heretofore described.

Similarly, dog hubs provided on the output shaft 206 and located on either side of the output to the planetary gear train 213 can be used to rotationally couple it to the output shaft 206 in a like manner.

In the heretofore described transmission 10, the gears able to be selectively coupled to the bridging shaft 14 include the primary gear 18b and the quaternary gear 22b (which is a compound gear). However, in other embodiments the compound quaternary gear 22b could instead be replaced by two separate gears that are respectively able to be rotationally fixed to the bridging shaft 14 in a manner appropriate to enable the required changes in gear ratio between the torque input and output 13, 15 to be implemented. Furthermore: i) the order of respective gears carried by the bridging shaft 14 (i.e. all gears carried thereby including those permanently fixed thereto); and ii) the respective gear ratios between those gears and gears carried by the input and output shafts 12, 16; are free to be chosen by those of ordinary skill in the art in order to enable whatever step changes in gear ratio between the input and output shafts 12, 16 are required to be implemented in use.

In general the heretofore described transmission 10 can be described as a transmission 10 including a plurality of shafts 12, 14, 16 each carrying gears 18a, 20a, 22a, 18b, 20b1, 20b2, 22b, 18c, 20c, 22c for transferring load between a torque input 13 and a torque output 15 of the transmission which is configured such that respective resultant gear ratios between the torque input and the torque output can be selected in use from each of a plurality of groups thereof ($1^{st}$-$3^{rd}$; $4^{th}$-$6^{th}$; $7^{th}$-$9^{th}$) by changing a load path between the torque input and the torque output, wherein each said group of selectable resultant gear ratios has a load path feature for transferring load between a pair of the shafts which is common to the selectable resultant gear ratios within that group. The $1^{st}$ to $3^{rd}$ selectable gear ratio configurations define a first group of selectable gear ratios, wherein the interface between the quaternary gear 22b on the bridging shaft 14 and the third gear 22c on the output shaft 16 is the common load path feature for each of the $1^{st}$ to $3^{rd}$ selectable gear ratio configurations (FIGS. 3 to 5). The $4^{th}$ to $6^{th}$ selectable gear ratio configurations define a second group of selectable gear ratios, wherein the interface between the secondary gear 20b1 on the bridging shaft 14 and the second gear 20c on the output shaft 16 is the common load path feature for each of the $4^{th}$ to $6^{th}$ selectable gear ratio configurations (FIGS. 6 to 8). The $7^{th}$ to $9^{th}$ selectable gear ratio configurations define a third group of selectable gear ratios, wherein the interface between the primary gear 18b on the bridging shaft 14 and the first gear 18c on the output shaft 16 is the common load path feature for each of the $7^{th}$ to $9^{th}$ selectable gear ratio configurations (FIGS. 9 to 11).

It will be appreciated that whilst various aspects and embodiments of the presently disclosed subject matter have heretofore been described, the scope of the presently disclosed subject matter is not limited to the embodiments set out herein and instead extends to encompass all arrangements, and modifications and alterations thereto, which fall within the spirit and scope of the presently disclosed subject matter.

The invention claimed is:

1. A multiple gear range transmission for use with a torque input and a torque output, comprising:
   an input shaft;
   an output shaft; and
   only one bridging shaft arranged in a triangular arrangement, each carrying a plurality of drive members, the bridging shaft not being connected to the torque input or the output;
   wherein drive members on the bridging shaft operatively cooperate with those carried on either the input shaft and/or output shaft so as to transfer load between the input shaft and the output shaft via a plurality of selectable load paths corresponding to a plurality of respective resultant gear ratios grouped in at least two gear ranges;
   wherein each shaft has one or more drive members capable of being selectively rotationally fixed to the shaft;
   wherein successive gear ratios up or down a gear range are selectable, using load paths that include different respective drive members from one of either the input or output shafts;
   wherein successive gear ranges are selectable using load paths that include different respective drive members from the other of either the input or output shafts; and
   wherein a transition from a selected gear at the top or bottom of a selected gear range to the next available gear in the next available gear range involves selection of a new load path comprising drive members from the input and output shaft that are not involved in the load path for the currently selected gear.

2. The transmission of claim 1, wherein all the drive members on the input shaft are capable of being selectively rotationally fixed to the shaft.

3. The transmission of claim 1, wherein all the drive members on the output shaft are capable of being selectively rotationally fixed to the shaft.

4. The transmission of claim 1, wherein all the drive members capable of being selectively rotationally fixed to a shaft are fixed in a manner allowing torque to be transmitted in two opposed directions.

5. The transmission of claim 4, wherein the drive members capable of being selectively rotationally fixed to a shaft are so fixed by engaging dog hubs that rotate with the shaft on either side of each such drive member, and wherein a forward driving dog hub for one drive member is mechanically coupled to a reverse driving hub for another said drive member such that those two dog hubs cannot be caused to engage such drive members simultaneously.

6. The transmission of claim 5, wherein the input shaft and/or the output shaft includes a pair of such drive members at its respective ends, and a forward driving dog hub for one of those drive members is mechanically coupled to a reverse driving hub for the other of those drive members such that those two dog hubs cannot be caused to engage those drive members simultaneously.

7. The transmission of claim 1, wherein at least one end drive member on the bridging shaft, and preferably both end drive members on the bridging shaft, are capable of being selectively rotationally fixed to the shaft.

8. The transmission of claim 1, wherein respective drive members, such as the end drive members, of the input shaft, output shaft and bridging shaft form a simple spur gear train across those shafts.

9. The transmission of claim 1, wherein respective drive members of the output shaft and bridging shaft form a compound gear train or planetary gear train across those shafts.

10. The transmission of claim 9, wherein the bridging shaft includes at least one compound drive member including two differently sized parts that rotate together and that operatively cooperate with drive members on the input shaft and output shaft, respectively, to form a compound gear train across the three shafts.

11. The transmission of claim 1, wherein the size and configuration of the drive members is selected such that, when progressing from the lowest gear to the highest gear in the transmission, all the steps in gear including transitions between gear ranges, are substantially equal steps.

12. A vehicle, comprising:
    the transmission according to claim 1.

13. A transmission for use with a torque input and a torque output, comprising:
    a plurality of shafts, each carrying a plurality of drive members, the drive members on each said shaft configured to operatively cooperate with those carried by at least one other said shaft for transferring load between the torque input and the torque output in use, the transmission being configured such that respective resultant gear ratios between the torque input and the torque output can be selected in use from each of a plurality of groups thereof by changing a load path between the torque input and the torque output,
    wherein each said group of selectable resultant gear ratios has a load path feature for transferring load between a pair of the shafts which is common to the selectable resultant gear ratios within that group,
    wherein any of the drive members which are not permanently rotationally fixed to one of the shafts can be selectively rotationally fixed to the shaft carrying it by engaging dog hubs rotationally fixed to the shaft with either side of the drive member, and wherein for one of the shafts a forward driving dog hub for one said drive member is mechanically coupled to a reverse driving dog hub for another said drive member such that these two dog hubs cannot be caused to engage such drive members simultaneously.

14. The transmission of claim 13, wherein different configurations of the transmission can be selected in use each having a different combination of said drive members rotationally fixed to the shafts for changing the load path and resultant gear ratio between the torque input and the torque output.

15. The transmission of claim 13, wherein for at least one said group of selectable resultant gear ratios the load path feature for transferring load between said pair of shafts and common to the selectable resultant gear ratios within that group is a pair of gears carried by each of the pair of shafts that are in mesh with one another.

16. The transmission of claim 13, wherein for at least one said group of selectable resultant gear ratios the load path feature for transferring load between said pair of shafts and common to the selectable resultant gear ratios within that group includes one or more planetary gear sets.

17. The transmission of claim 13, wherein for one of the shafts changing which one of the drive members is rotationally fixed thereto causes a change in the range of resultant gear ratios that can be selected by changing which of the drive members are rotationally fixed to the other shafts.

18. The transmission of claim 17, wherein in order to sequentially progress through each of the selectable resultant gear ratios of the transmission, which one of the drive members is rotationally fixed to said one of the shafts is to be changed fewer times than which of the drive members are rotationally fixed to the other shafts.

19. The transmission of claim 17, wherein in order to sequentially progress through each of the selectable resultant gear ratios of the transmission, between respective changes in which one of the drive members is rotationally fixed to said one of the shafts which of the drive members are rotationally fixed to the other shafts is to be changed a plurality of times.

20. The transmission of claim 14, wherein whenever the top selectable gear ratio of a said group is engaged in use not all of the drive members required to be rotationally fixed to respective said shafts in order for torque to flow along the load path of the next, higher, selectable gear ratio are so rotationally fixed to respective said shafts.

21. The transmission of claim 13, comprising:
 a first shaft in operative connection with either the torque input or the torque output of the transmission;
 a second shaft in operative connection with the other of the torque input and the torque output of the transmission; and
 an additional shaft carrying some said drive members that are configured to operatively cooperate with said drive members carried by the first and second shafts; wherein changing which one of the drive members is rotationally fixed to either the first or second shaft causes a change in the range of resultant gear ratios that can be selected by changing which of the drive members are rotationally fixed to the other shafts.

22. The transmission of claim 21, wherein in order to sequentially progress through each of the selectable resultant gear ratios of the transmission, which one of the drive members is rotationally fixed to either the first or second shaft is to be changed fewer times than which of the gears are rotationally fixed to the other shafts.

23. The transmission of claim 21, wherein in order to sequentially progress through each of the selectable resultant gear ratios of the transmission, between respective changes in which one of the drive members is rotationally fixed to either the first or second shaft which of the drive members are rotationally fixed to the other shafts is to be changed a plurality of times.

24. The transmission of claim 13, wherein the shafts extend along the same notional plane, or, wherein the shafts do not extend along the same notional plane and are optionally arranged in a triangular arrangement.

* * * * *